United States Patent
Roodenburg et al.

(10) Patent No.: US 12,325,610 B2
(45) Date of Patent: Jun. 10, 2025

(54) FEEDER VESSEL

(71) Applicant: ITREC B.V., Schiedam (NL)

(72) Inventors: Joop Roodenburg, Schiedam (NL); Hubertus Lourens Leendert Tieleman, Schiedam (NL)

(73) Assignee: ITREC B.V., Schiedam (NL)

( * ) Notice: Subject to any disclaimer, the term of this patent is extended or adjusted under 35 U.S.C. 154(b) by 558 days.

(21) Appl. No.: 17/788,099

(22) PCT Filed: Dec. 18, 2020

(86) PCT No.: PCT/EP2020/087219
§ 371 (c)(1),
(2) Date: Jun. 22, 2022

(87) PCT Pub. No.: WO2021/130133
PCT Pub. Date: Jul. 1, 2021

(65) Prior Publication Data
US 2023/0043092 A1  Feb. 9, 2023

(30) Foreign Application Priority Data
Dec. 23, 2019 (NL) ..................... 2024562

(51) Int. Cl.
*B63B 27/10* (2006.01)
*B63B 27/30* (2006.01)
*B66C 1/10* (2006.01)

(52) U.S. Cl.
CPC .............. *B66C 1/108* (2013.01); *B63B 27/10* (2013.01); *B63B 27/30* (2013.01)

(58) Field of Classification Search
CPC ............ B66C 1/08; B63B 27/10; B63B 27/30
See application file for complete search history.

(56) References Cited

U.S. PATENT DOCUMENTS

| 4,174,188 A * | 11/1979 | Brun ................... B66C 13/02 414/803 |
| 10,308,327 B1 * | 6/2019 | Van Loon ............... F03D 13/10 |

FOREIGN PATENT DOCUMENTS

| EP | 0 369 548 A1 | 5/1990 |
| EP | 2572976 A1 * | 3/2013 ............. B63B 27/10 |

(Continued)

OTHER PUBLICATIONS

Dutch Search Report, issued in Priority Application No. 2024562, dated Sep. 11, 2020.

(Continued)

*Primary Examiner* — S. Joseph Morano
*Assistant Examiner* — Jovon E Hayes
(74) *Attorney, Agent, or Firm* — Birch, Stewart, Kolasch & Birch, LLP

(57) ABSTRACT

A feeder vessel for the onshore-to-offshore transport of elongate wind turbine objects with a motion compensating carrier assembly having a motion compensated platform for receiving and retaining the elongate object, and a motion compensation mechanism. The motion compensation mechanism includes extendable actuators which passively compensate motions of the platform out of a neutral position, and winches driving carrier cables such that traction by the respective carrier winch counteracts an extension of at least one of the carrier actuators. The winches are embodied as active motion compensation winches to compensate movements of the platform.

12 Claims, 12 Drawing Sheets

(56) References Cited

FOREIGN PATENT DOCUMENTS

| EP | 3 550 175 A1 | 10/2019 | |
|----|----|----|----|
| KR | 10-2009-0094561 A | 9/2009 | |
| NL | 7705998 A | 12/1977 | |
| WO | WO-2009048322 A1 * | 4/2009 | ............ B63B 27/10 |
| WO | WO-2018052291 A1 * | 3/2018 | ........... B66C 23/185 |
| WO | WO-2018106120 A1 * | 6/2018 | ............ B63B 17/00 |
| WO | WO-2021130133 A1 * | 7/2021 | ............ B63B 25/28 |

OTHER PUBLICATIONS

International Search Report, issued in PCT/EP2020/087219, dated Mar. 25, 2021.
Written Opinion of the International Searching Authority, issued in PCT/EP2020/087219, dated Mar. 25, 2021.

* cited by examiner

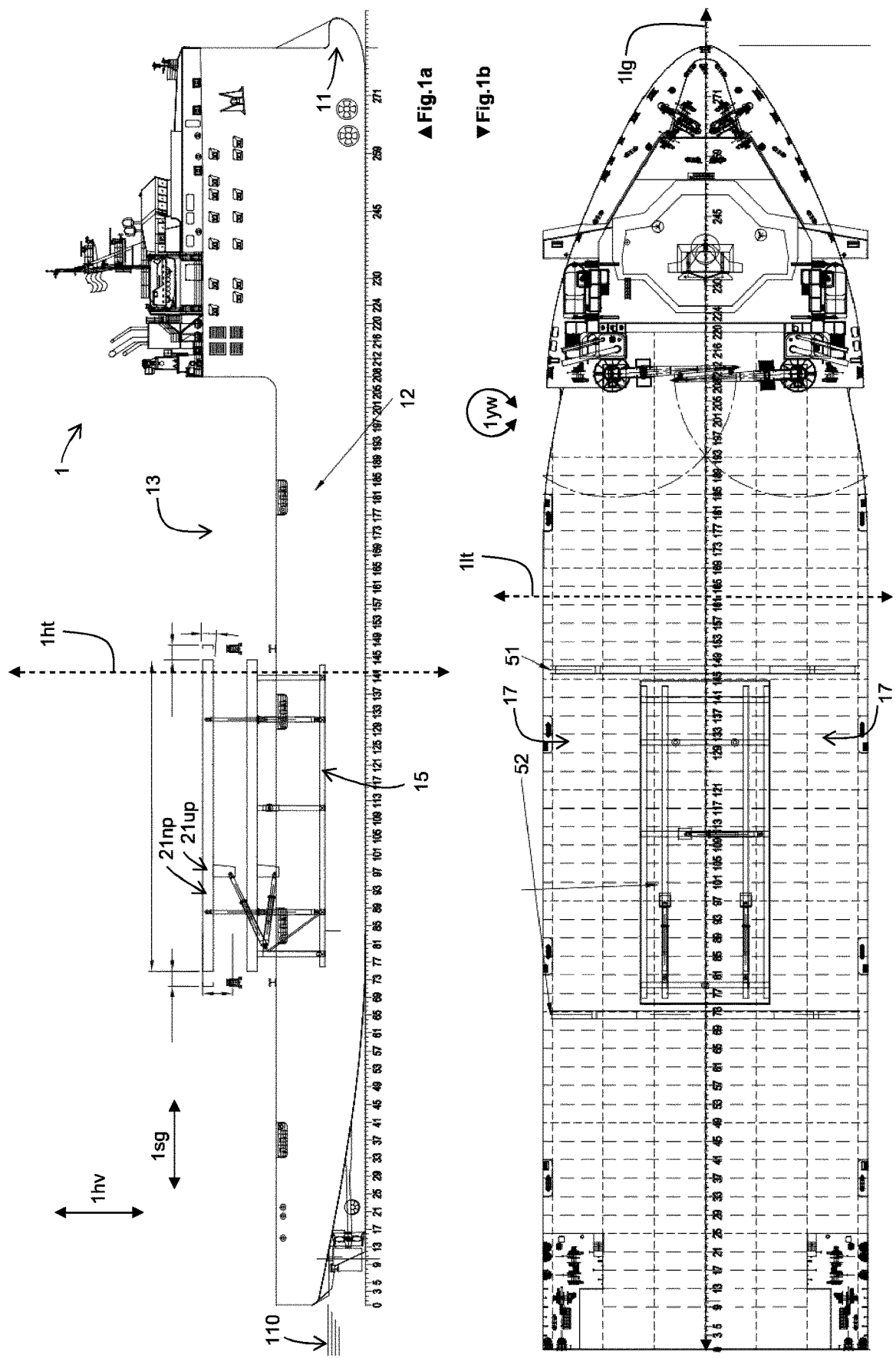

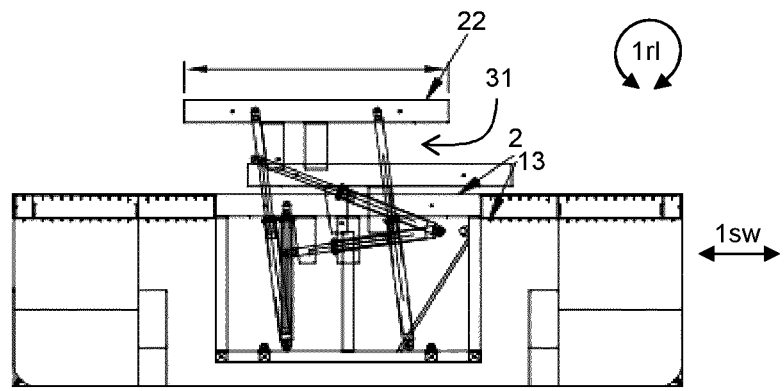
▲Fig.1c
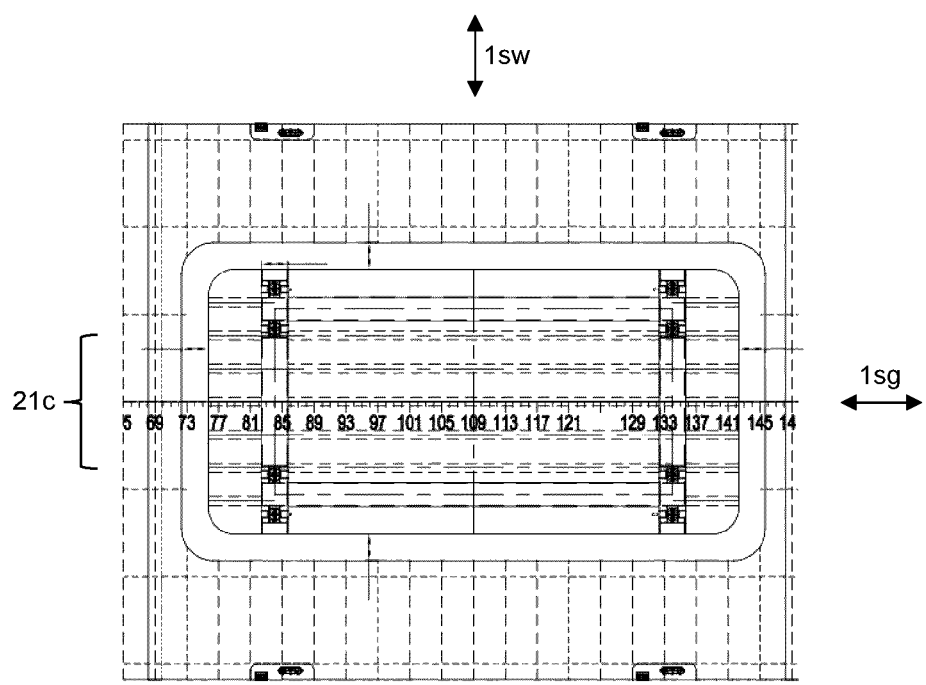
▲Fig.1d

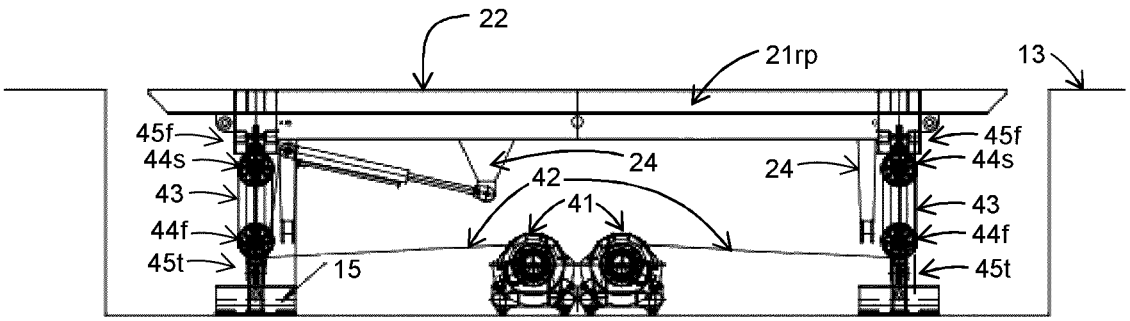
▲Fig.2a
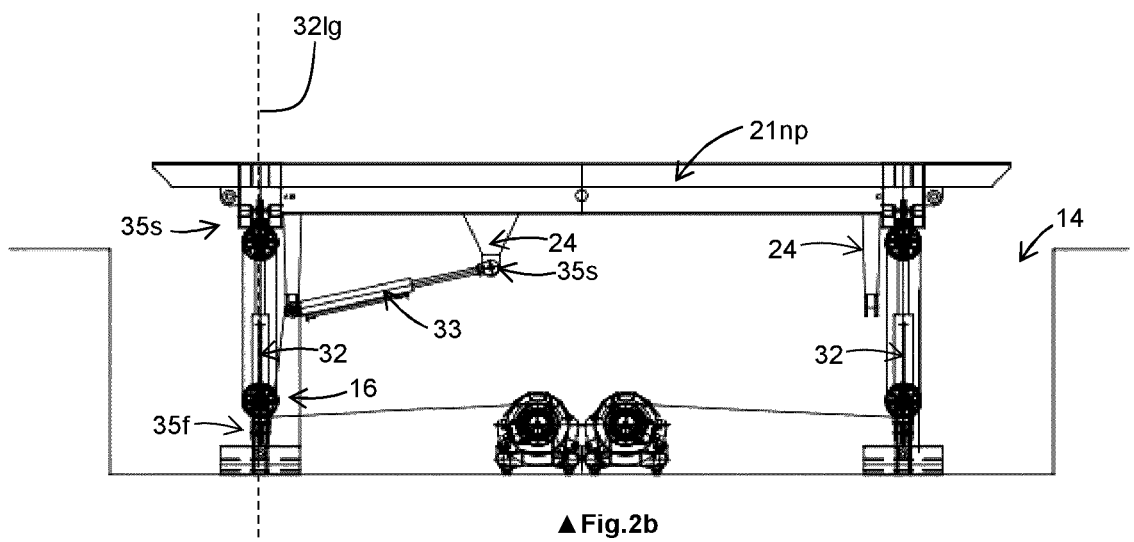
▲Fig.2b
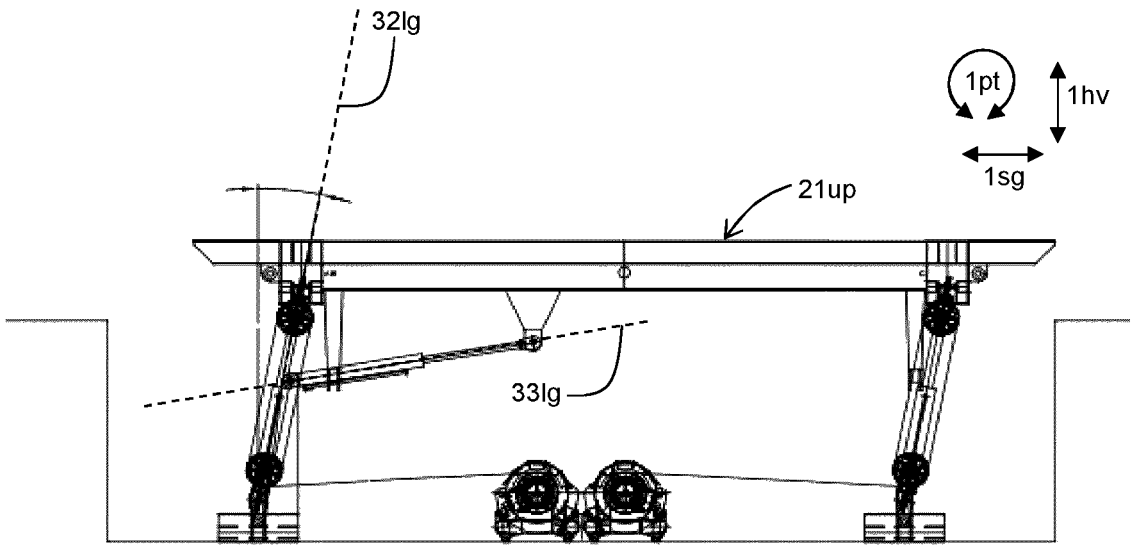
▲Fig.2c

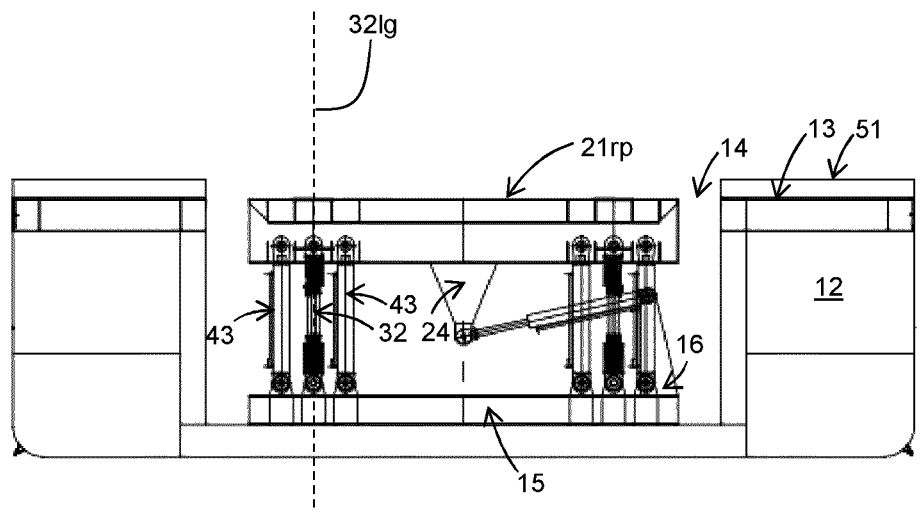
▲Fig.2d
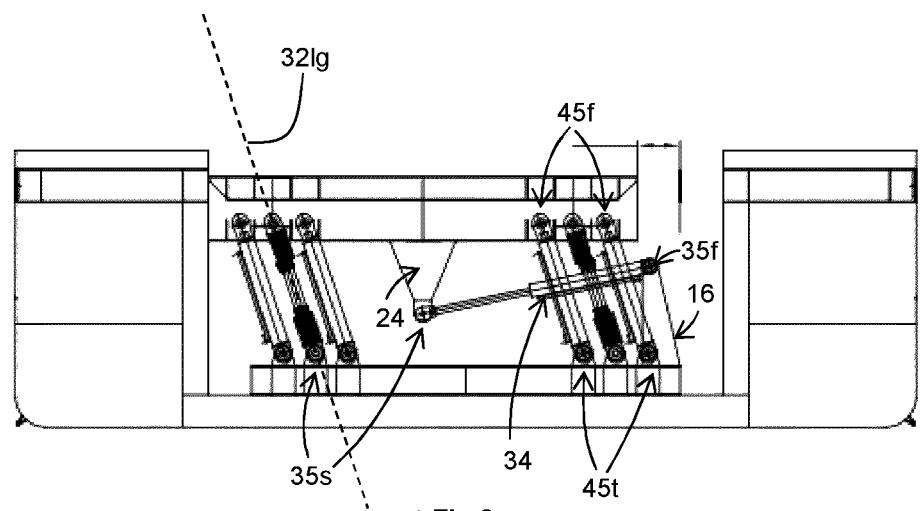
▲Fig.2e
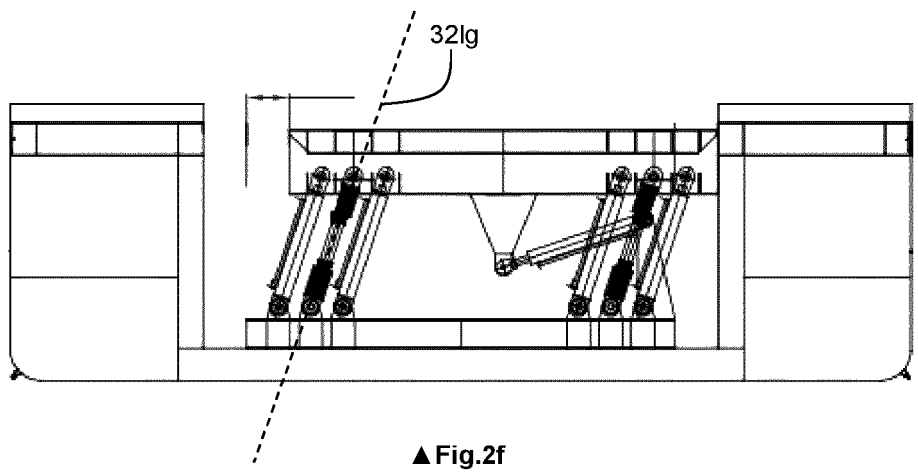
▲Fig.2f

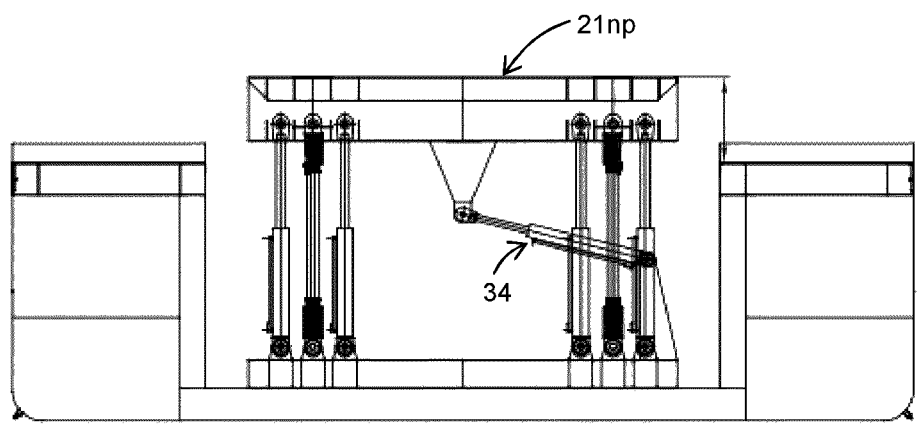
▲Fig.2g
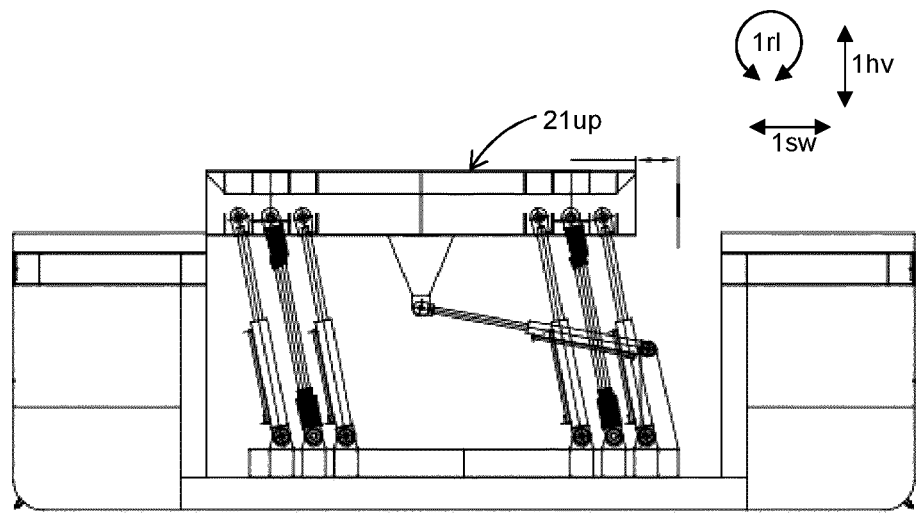
▲Fig.2h
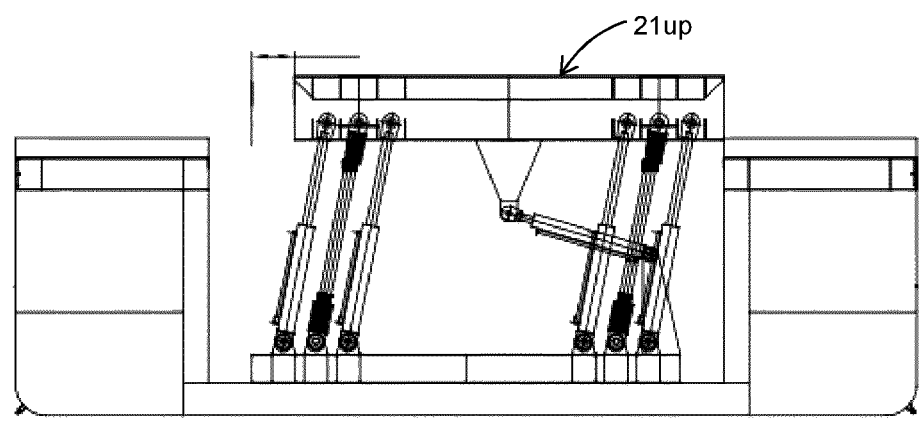
▲Fig.2i

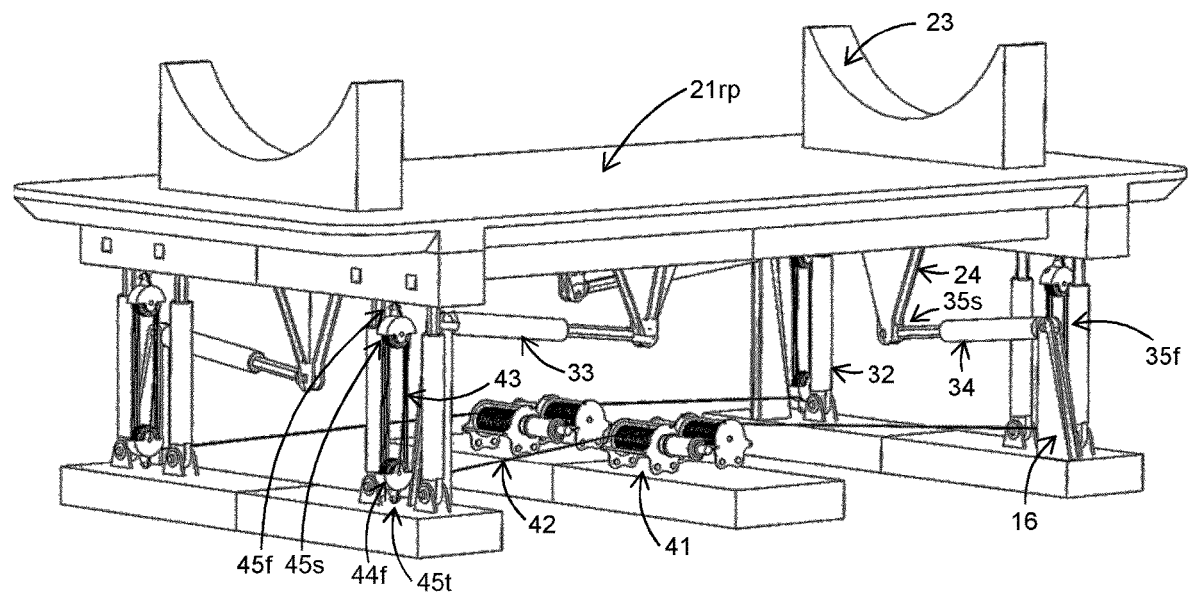
▲ Fig.3a
▼ Fig.3b
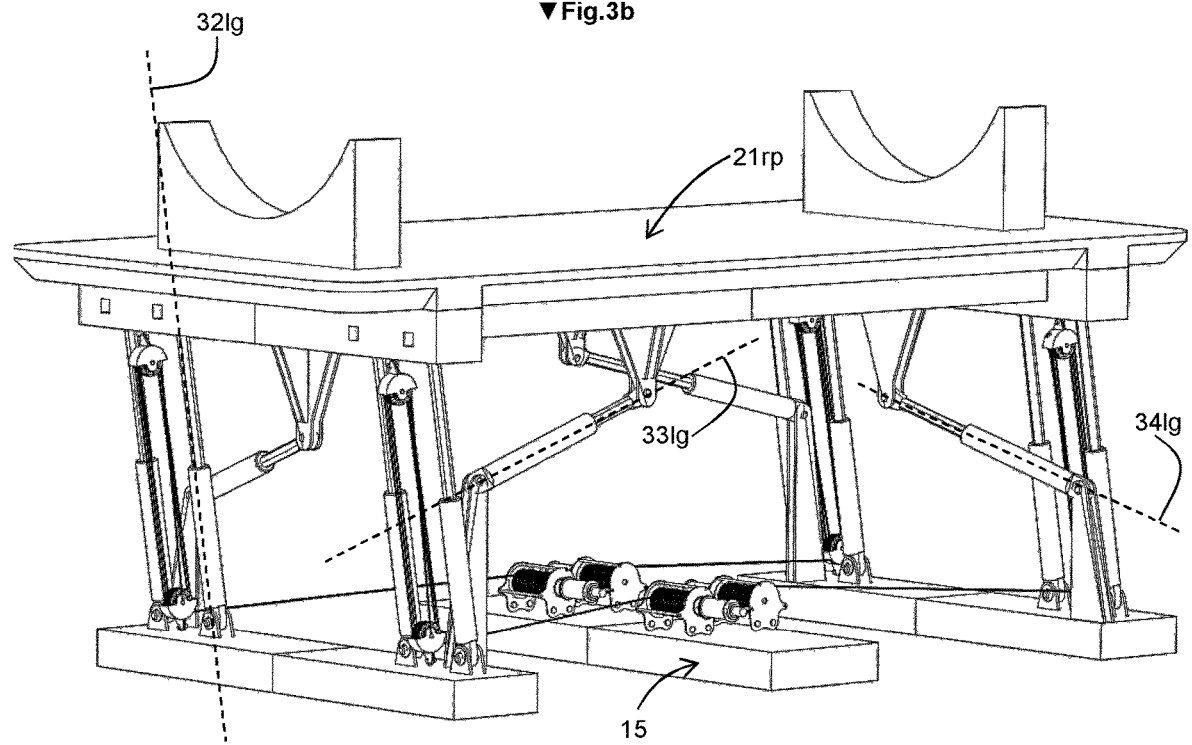

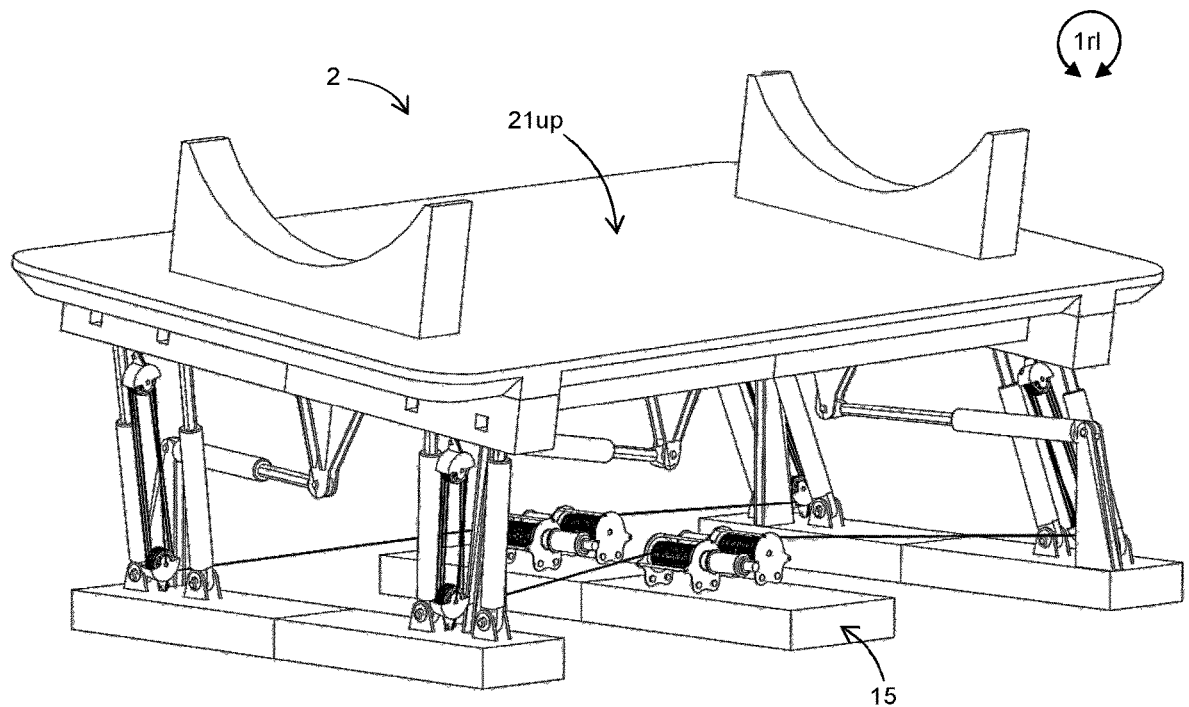
▲Fig.3c

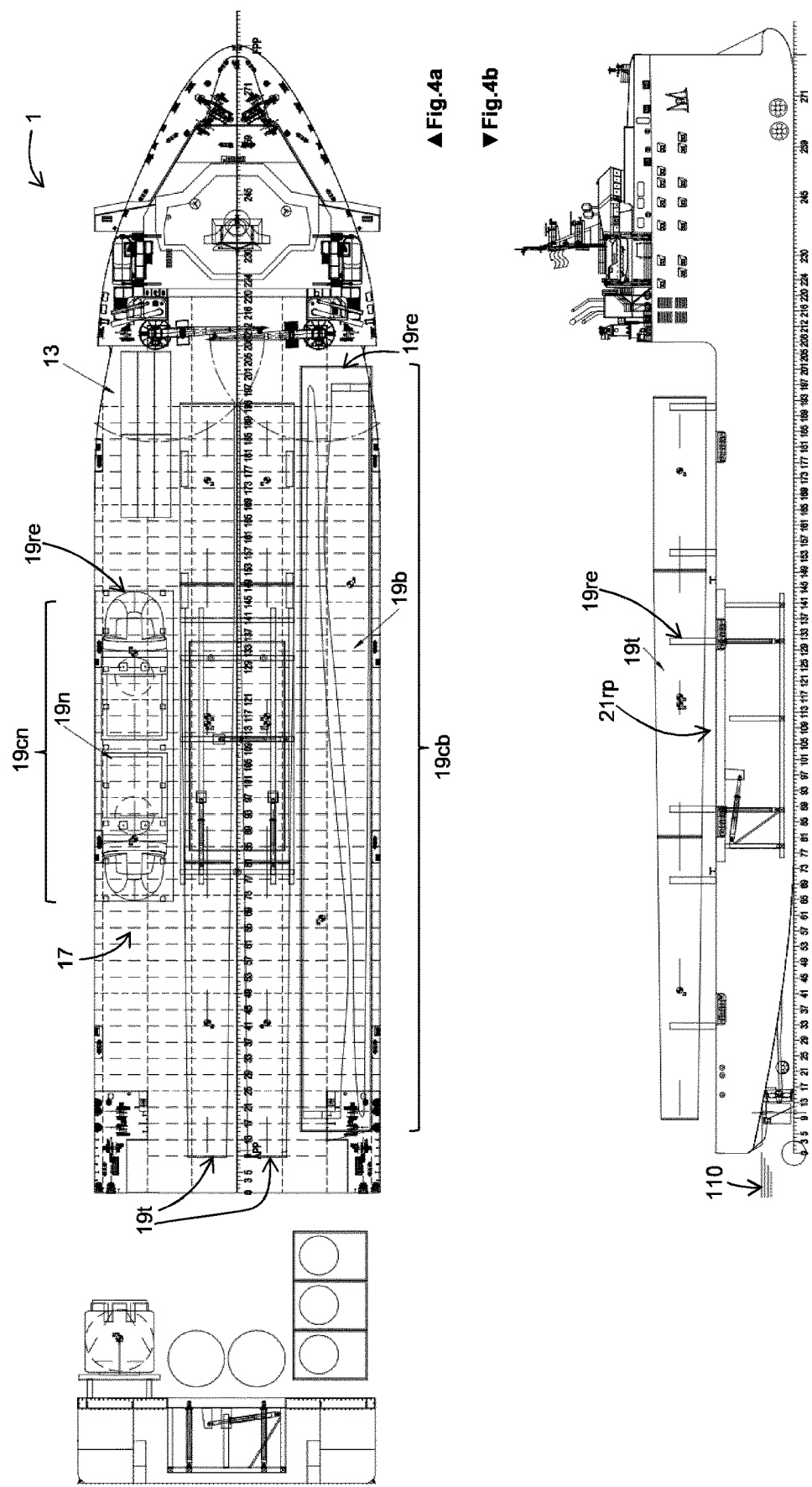

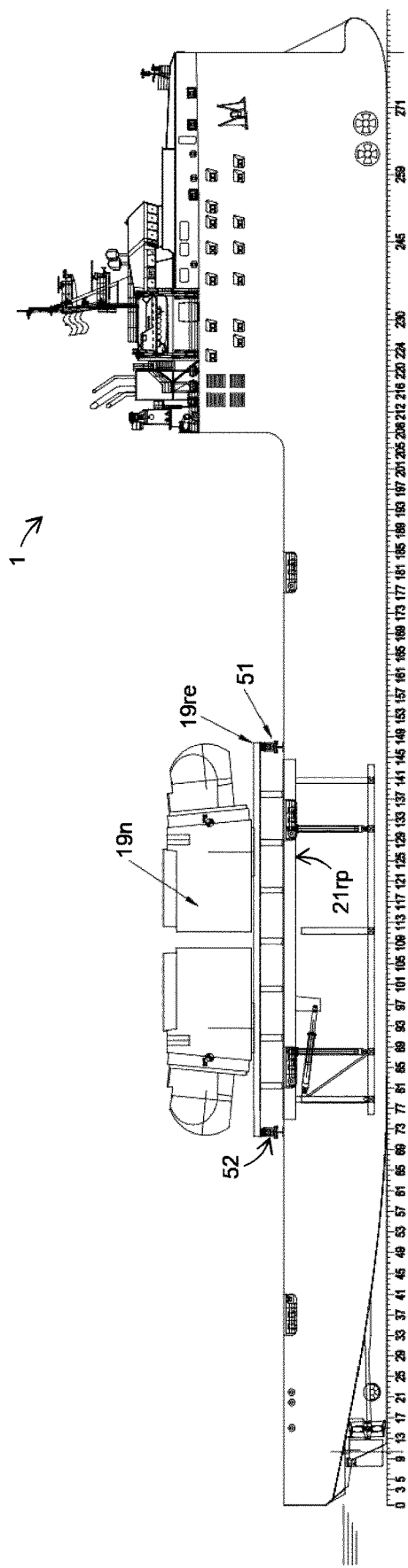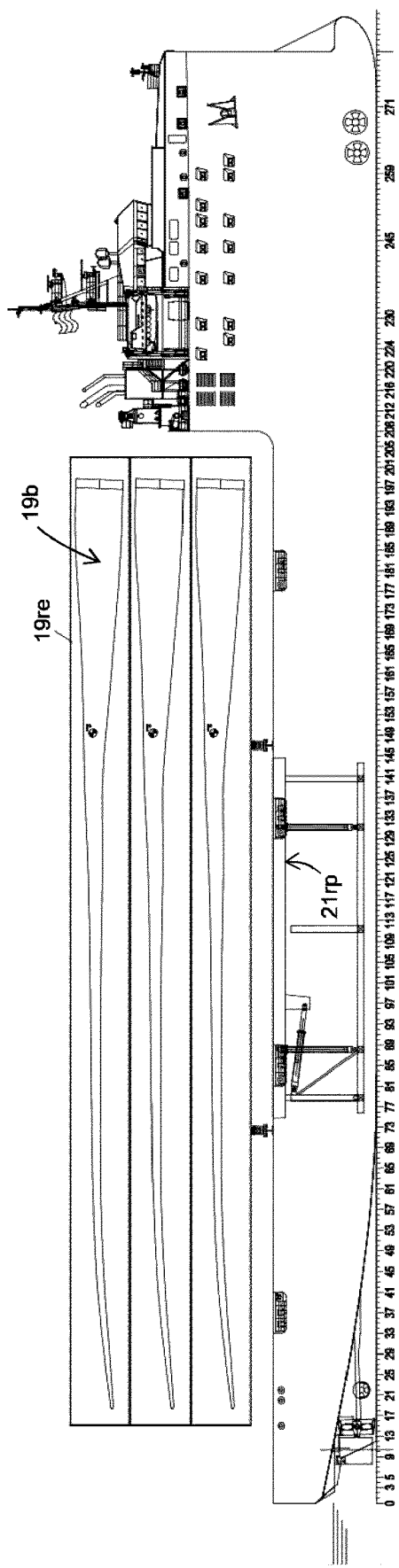
▲Fig.4c
▼Fig.4d

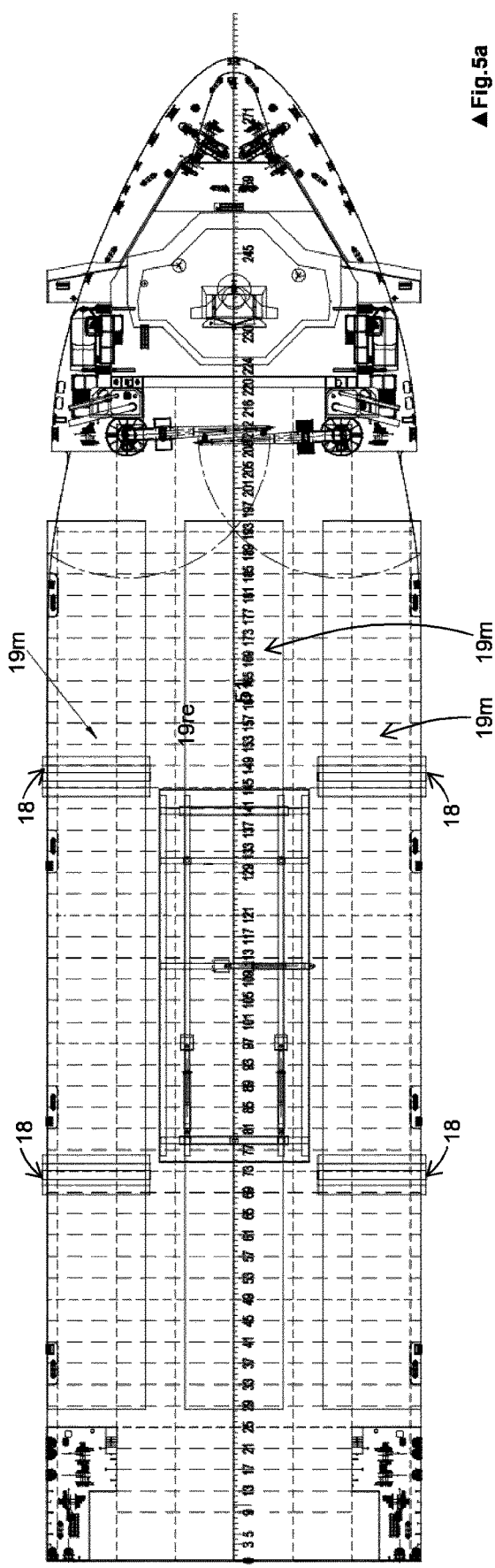
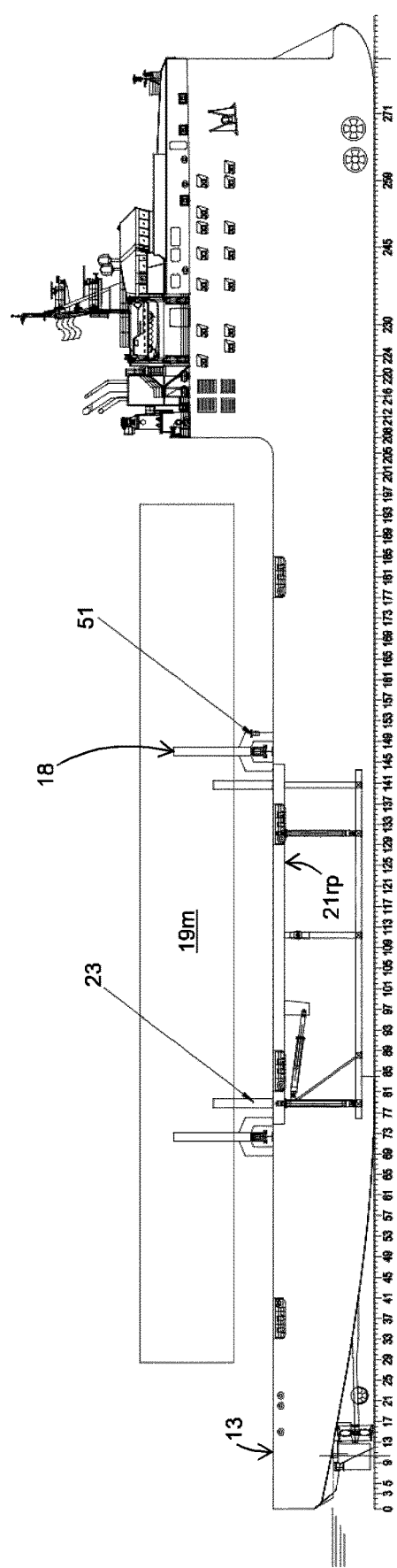
▲Fig.5a
▼Fig.5b

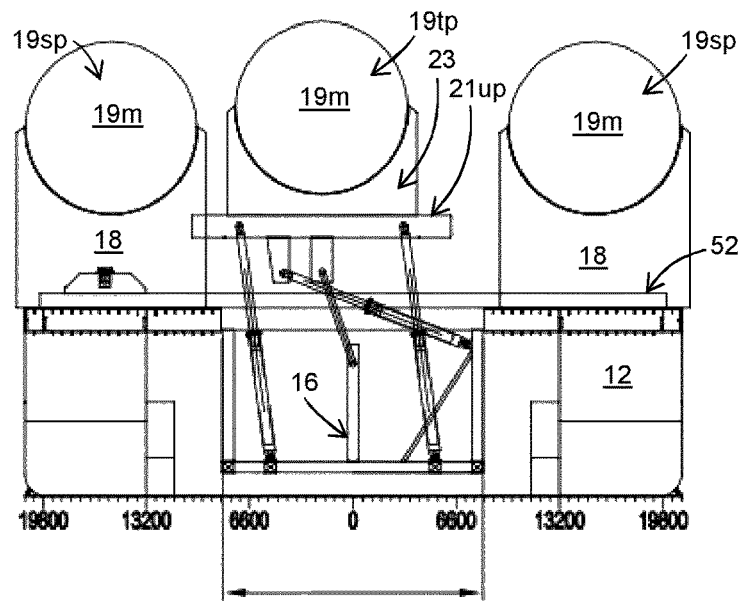
▲ Fig.6a
▼ Fig.6b
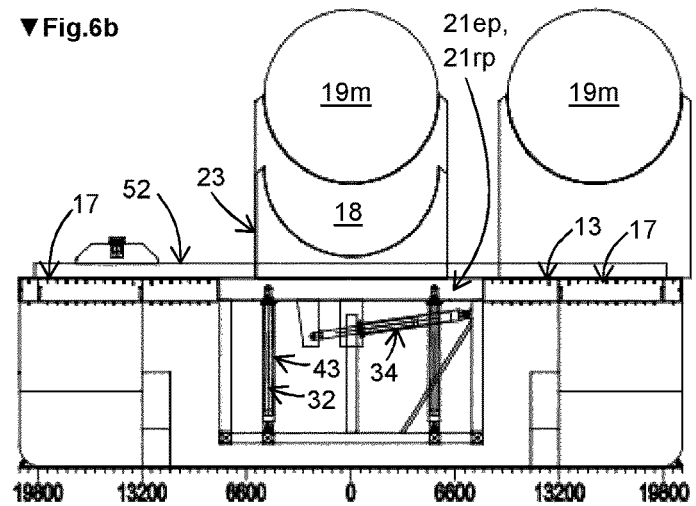
▼ Fig.6c
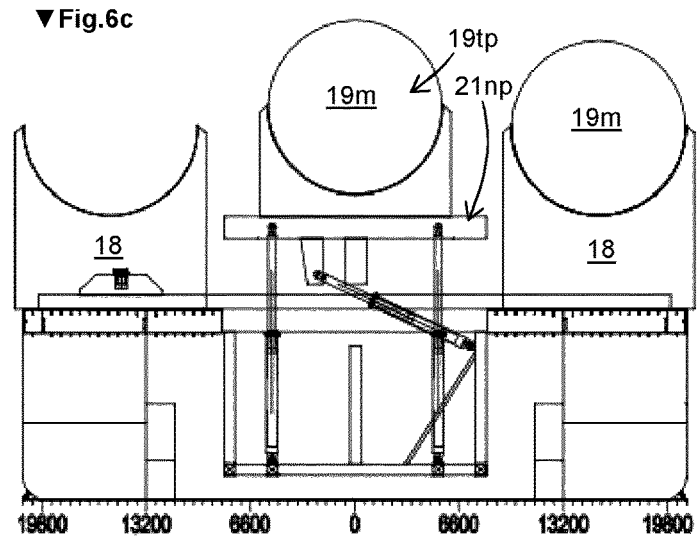

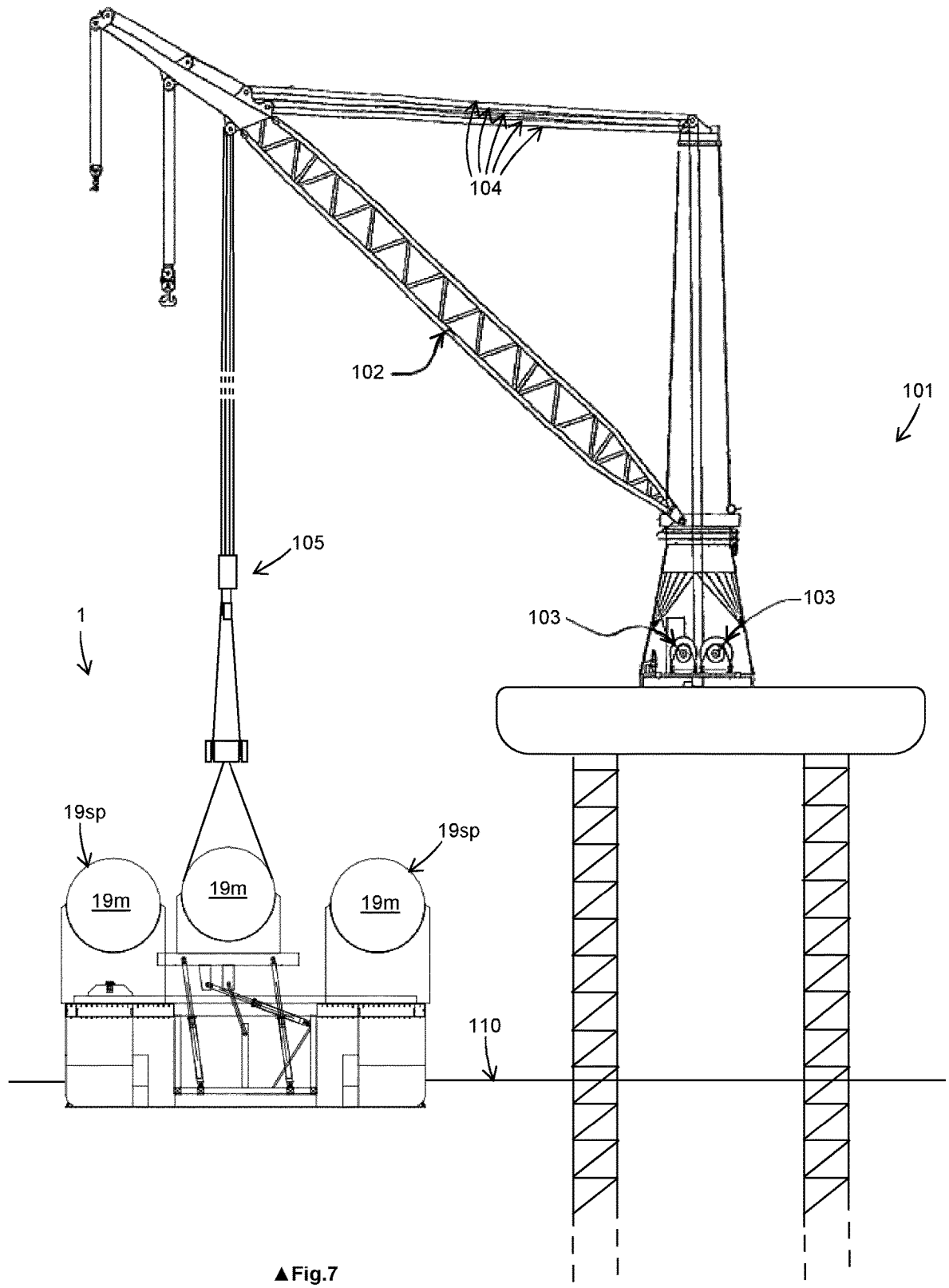
▲Fig.7

FEEDER VESSEL

FIELD OF THE INVENTION

The invention relates to the field of feeder vessels, which are primarily used for onshore-to-offshore transport. For example, the need exists to transport elongate objects, such as wind turbine parts, from a location at the coast to an offshore location. For example, another vessel, such as a jack-up vessel, equipped with a crane is located at the offshore location in view of installation of an offshore wind turbine.

BACKGROUND OF THE INVENTION

It is envisaged that the feeder vessel is used for transport of offshore wind turbine parts, for example a foundation, e.g. a monopile, a mast, a nacelle, and/or wind turbine blades, from the onshore location to a jack-up vessel equipped with a crane that is located at sea where the wind turbine is to be installed.

Once the offshore location is reached, the one or more elongated objects are transferred from the feeder vessel, e.g. onto the deck of the other vessel, e.g. of the crane equipped jack-up vessel, or are directly installed, e.g. a monopile being driven into the seabed or a tower, or mast, being placed on a foundation. The transfer is envisaged to be performed by means of a lifting device, e.g. a crane, onboard of the other vessel. The feeder vessel is stationed, e.g. by dynamic positioning or moored, directly next to the other vessel, after which the lifting device engages the elongate object on the feeder vessel and lifts it of the feeder vessel.

In order to engage the object located on the feeder vessel, the lifting device generally lowers an object suspension device, e.g. a crane hook, e.g. with a spreader suspended from the crane hook, towards the object on the feeder vessel, which object suspension device is configured to engage on or be otherwise coupled with the object such as to suspend the object from the lifting device. It is envisaged that, the feeder device is floating on the waves of the sea, which causes continuously varying relative movements of the feeder vessel with respect to the other vessel, and therewith, relative to the object suspension device that is being lowered from the other vessel, e.g. the raised jack-up crane vessel. These movements of the feeder vessel exhibit six degrees of freedom, namely the three movements of heave, surge and sway, and the three rotational movements of yaw, pitch and roll. As the feeder vessel supports the object to be transferred, the object thereon is also subject to these same sea state induced movements.

These relative movements complicate making the connection between the object suspension device and the object and complicate the act of transfer. It may necessitate waiting with the transfer for a timeframe with relatively calm conditions, and/or time consuming or complicated operations. This complication is attenuated by the fact that the relative movements are irregular and rather unpredictable in time, direction, and/or amplitude.

Furthermore, after the engagement and the start of lifting the object from the feeder vessel by the lifting device, the relative movement between the feeder vessel and the suspended elongated object may cause the feeder vessel to collide with the object, e.g. when the feeder vessel after the engagement and start of lifting moves upwards on a wave. This collision could damage the lifted object, part of the vessel, or both, and/or other items in the vicinity of the lifted object. For instance, after a collision, the object may be subject to uncontrolled swinging movements.

In the prior art several solutions have been suggested to overcome these complications in the transfer of an object from a floating vessel that is subject to the movements due to the sea waves.

U.S. Ser. No. 10/308,327 discloses a vessel wherein wave motions are compensated by use of active compensating cylinders between multiple movable supports and the upper deck of the vessel, wherein the elongate object to be transferred is supported on the movable tables. The risk for a collision of the lifted object with the vessel is reduced by moving the supports downward after the engagement of the elongate object, making use of the same cylinders.

EP2572976 discloses a vessel wherein heave motions are compensated by the use of vertical active heave compensating cylinders between a lower deck of the vessel and a load table, vertically movable between the height of the upper deck and positions there above. As in U.S. Ser. No. 10/308,327, the risk for a collision of the lifted elongate object with the vessel is reduced by moving the load table downward after the engagement of the elongate object, making use of the same cylinders.

The disclosures of U.S. Ser. No. 10/308,327 and EP2572976 are unsatisfactory in terms of the control of the relative motions of the supported object and the stability of its position in space. This is especially the case when transferring objects of a substantial weight, e.g. wind turbine parts. For instance, a monopile or a jacket foundation currently weighs approximately a 1000 metric tonnes and may weigh up to even 1600 metric tonnes—which with the envisaged further increase of wind turbine sizes in the near future is expected to rise even further. This weight limits at least the speed, manoeuvrability and control of the object in manipulating the object, and in compensating its relative motions, e.g. during the transfer of the elongate object.

OBJECT OF THE INVENTION

The invention aims to provide an improved feeder vessel and a method for the onshore-to-offshore transfer of elongate objects.

SUMMARY OF THE INVENTION

The invention provides for a feeder vessel for onshore-to-offshore transport of at least one elongate object, the feeder vessel comprising a hull, the feeder vessel having a motion compensating carrier assembly supported on the hull, said carrier assembly having:
  one motion compensated platform, which is configured for receiving and retaining thereon an elongate object, the platform comprising a top surface,
  a motion compensation mechanism connecting the one motion compensated platform to the hull and configured to provide compensating movements of the platform with respect to the hull, said motion compensation mechanism comprising:
    multiple extendable carrier actuators, each configured to extend and shorten along a respective longitudinal axis thereof, each connected at a respective first longitudinal end thereof via a respective first pivotal coupling to the hull and at a respective second longitudinal end via a second pivotal coupling to the platform,
    one or more carrier winches, each carrier winch configured for driving a carrier cable of which a cable segment extends from the respective carrier winch to the platform, such that traction by the respective carrier winch counteracts an extension of at least one of the carrier actuators, wherein the multiple extendable carrier actuators are embodied as passive motion compensators to provide passive compensating movements of the platform, and wherein the one or more carrier winches are embodied as active motion compensation winches to provide active compensating movements of the platform.

Examples of elongate objects to be transported using the feeder vessel according to the invention are elongate wind turbine components, such as a full tower, tower parts to be stacked in order to form a tower, one or more rotor blades, a rack with one or more rotor blades. Other examples are wind turbine foundation components such as monopiles, transition pieces, anode cages, or an anode cage tower containing multiple anode cages, and jacket foundations. Other examples, whilst not being truly elongate, are nacelles, a nacelle with pre-assembled rotor blades, and equipment to be installed inside the nacelle, e.g. generator, gearbox, etc. Any plurality of these wind turbine components being retained by a cradle, rack or other retaining element may also form an elongate object to be handled, More general items are also envisaged to be handled by the inventive feeder vessel, such supply containers of any kind, installation equipment for offshore wind turbines or foundations thereof, and spare vessel and equipment parts.

The invention provides, in addition to passive motion compensation of the platform relative to the hull, e.g. relative to the support, e.g. to the lower support, by one or more extendable carrier actuators, the use of one or more carrier winches for moving the platform towards the hull, e.g. towards the support, e.g. lower support, on command.

In a preferred embodiment, each carrier winch has a motor driven drum onto which the associated cable is wound.

The use of the one or more carrier winches results in an improved control of the relative motions of the platform, and thereby, of an elongate object supported thereon, as traction by the carrier winches is highly responsive. In practical embodiments, the traction by these winches may move the platform more rapidly and more accurately in a direction towards the hull, e.g. towards the support, e.g. lower support, than when such motion would be performed by any hydraulic cylinders engaging on the platform, which may be more cumbrous or slow to set in motion. This improved speed and accuracy may, for example, also be advantageous during a last stage of the transfer of the weight of the elongate object from the platform to the lifting device, wherein the elongate object and the platform are to be truly moved away from each other to prevent a later collision there between.

In general, the use of the carrier winches in the inventive design may increase the permissible weather window for operations using the vessel.

The invention provides one or more carrier winches as part of a motion compensation mechanism, which also comprises the passive acting extendable carrier actuators. The multiple carrier winches are embodied as active motion compensation winches to provide compensating movements of the platform out of a neutral position. Herein each winch drives a carrier cable which extends from the winch to the platform. Of this carrier cable, a cable segment extends such that traction by the winch shortens said cable segment and paying out enables lengthening thereof. The shortening of the cable segment counteracts an extension of at least one of the extendable carrier actuators and moves the platform towards the neutral position in the direction of the hull, e.g. the support.

The extendable carrier actuators are each configured to extend and shorten along a longitudinal axis thereof. Each extendable carrier actuator is connected at a first longitudinal end via a first pivotal coupling to the hull, e.g. to the support, and at a second longitudinal end via a second pivotal coupling to the platform.

The extendable carrier actuators each realize a passive motion compensation of the platform with respect to the hull, e.g. to the (lower) support in the direction of their extension, providing compensating movements of the platform, e.g. in and out of a neutral position. The extendable carrier actuators may, for example, include mechanical springs and/or dampers.

In a practical embodiment, the carrier actuators each comprise a hydraulic cylinder with a piston and piston rod, e.g. a single-acting cylinder, wherein the hydraulic cylinder is hydraulically connected to a medium separator, which medium separator is further connected to a pressurized gas buffer.

Other configurations of the extendable carrier actuators are also possible, e.g. the carrier actuators including a mechanical spring and/or damper that compensates a movement of the pivotal couplings towards each other. Another possibility is to have the separation include in-line tension spring assemblies, e.g. including a plurality of elastomeric tension elements, see e.g. EP3550175A1.

The first and second pivotal couplings allow the longitudinal axis, and thereby the direction of the extension, of each carrier actuator to be pivotal with respect to the hull, e.g. to the (lower) support and the platform, respectively. Preferably, the multiple carrier actuators and the first and second pivotal couplings together enable a motion compensation of the platform in six degrees of freedom with respect to the hull, e.g. to the (lower) support, and thereby, to the vessel—compensating the lateral surge, heave and sway movements of the vessel and the rotational roll, yaw and pitch movements thereof.

In an embodiment, one or more of the pivotal couplings comprise a flexible, e.g. rubber material, member. In an embodiment, one or more of the pivotal couplings comprise a gimbal structure.

A benefit of the use of passive motion compensation provided by the carrier actuators is that these require no or little external energy for the motion compensation. As such, these actuators have a low power demand and may remain operational during a possible electrical black-out on-board the feeder vessel, which makes them low cost and failsafe.

The control of the relative motions of the elongate object may be improved further by retaining the elongate object longitudinally on the feeder vessel only by means of one single motion compensated platform. Thereby the need, as in prior art feeder vessels, to tune the motions of multiple motion compensating platforms supporting one elongate object thereon to each other is eliminated. Furthermore, the retaining of one elongate object onto just one, preferably elongate, e.g. relatively lengthy, platform may lead to less motion compensating parts to be simultaneously controlled. This may reduce the complexity of algorithms directing these parts and of physical power- and data connections.

In an embodiment of the inventive feeder vessel, all the motion compensating equipment may be concentrated on the vessel in the region of, e.g. below, the one platform, which may further facilitate connection of the parts to control units and/or power supply. For example, it may lead to the use of less physical connections and less and shorter cables, which may reduce the sensitivity of the system to errors and required maintenance. Furthermore, the use of one single motion compensated platform to handle an elongate object on the vessel, e.g. a monopile, may lead to less moving parts, which may reduce the risk of failure and the need for maintenance. In all, the retaining the elongate object only onto one single motion compensated platform may enable a more robust retaining of the elongate object in a stationary position.

The feeder vessel may have just one motion compensating carrier assembly supported on just one lower support onboard the vessel, the assembly having one motion compensated platform for receiving and retaining the elongate object extending in a longitudinal direction of the vessel at a transfer position within a laterally central region of the platform, and having the motion compensation mechanism.

The motion compensated platform comprises a top surface, and optionally, longitudinally spaced apart retaining elements mounted on top of the top surface for engaging the elongate object at the transfer position as it extends in said longitudinal direction of the vessel. The engagement restricts the movement of the elongate object relative to the platform. Thereby the elongate object is held stationary relative to the platform, so that motions of the platform are directly transferred to the elongate object, including the relative motions with respect to the vessel as established by the motion compensation mechanism.

The retaining elements may e.g. in the case the elongate object is a rotor blade, be two or more blade saddles, aligned in the longitudinal direction, or in the case the elongate object is a monopile, be two or more cradles complementary to the outer circumference of the monopile.

The stability of the position of the elongate object may be improved further by supporting the platform onto a lower part of the hull, e.g. onto a lower support that is close to, preferably integrated with, the bottom of the hull of the vessel, e.g. the hull having an upper deck and an opening therein located above the lower part, e.g. support. Hereby motions of the lower part, e.g. support emanating from sea motions may have a reduced amplitude when compared to the upper deck, e.g. when compared to arranging the mechanism on an upper deck of a feeder vessel. An opening in the upper deck may be provided above the lower part, e.g. support, through which the motion compensating connection of the platform to the lower part, e.g. support is established. At least in the neutral position of the platform, the platform is located higher than and above the opening in the upper deck.

It will be appreciated that the mechanism may also be placed on a deck of the vessel, e.g. on an upper deck of the vessel.

It is noted that the provision of an opening in the upper deck and the arrangement of the lower part, e.g. support at a lower level in the hull may enable a position of the platform substantially at the height of the upper deck, e.g. flush therewith, in which objects, e.g. stored other elongate objects to be transferred to another structure, may be moved substantially horizontally onto the platform, e.g. laterally, e.g. skidded or wheeled onto the platform. In embodiments, the feeder vessel has a hull corresponding to a transport barge, for example lacking propulsion, the barge being towed.

In a practical embodiment, the vessel is a monohull vessel having an elongated hull, e.g. with an upper deck, e.g. with the lower support being arranged below the upper deck.

In another embodiment, the vessel is a catamaran type vessel, with two floating hull portions and an intermediate deck structure.

An operation of transporting the elongate object use the feeder vessel, e.g. to an offshore structure already present at an installation location for the elongate object, and an operation of transferring the object to be supported by a lifting device of another vessel or another structure, is further facilitated, among others in terms of speed and efficiency, by having the feeder vessel comprise a wave piercing bow, e.g. a bulbous bow, which pierces the waves during transport and as such facilitates the speed of the vessel.

In an embodiment, the feeder vessel has a bridge and crew superstructure, e.g. arranged at the bow of the vessel, with an upper deck aft of the bridge and crew superstructure.

The invention also provides for a feeder vessel, which combines the use of the carrier winches for active motion compensation and of passive motion compensation carrier actuators, the use thereof within one single motion compensating carrier assembly for one single motion compensating platform.

Advantageous embodiments are discussed below.

In an embodiment, the cable segment of the carrier cable driven by each carrier winch runs, in any upper position of the platform, parallel and directly next to the longitudinal axis of at least one of the carrier actuators assigned to the carrier winch. The effect is that the points of application on the hull, e.g. on the (lower) support and on the platform of the pulling force by the cable segment thereof and of the pulling and/or pushing force by the assigned carrier actuator are close to each other. This may advantageously further facilitate effective and accurate counteraction and/or addition of said forces during operation, and prevent interference of perpendicular bending forces or bending moments on the lower surface and/or platform and on the connected ends of the carrier actuators resulting from the simultaneous pulling and pushing forces by the cable segment and the assigned carrier actuator. Furthermore, the forces of the cable segment and assigned carrier actuator applying close to each other may result in a more accurate and simplified control of the relative positioning of the platform, as there are substantially no relative moment arms involved. Preferably, the cable segment even runs, in any upper position of the platform, centrally in between two longitudinal axes of two of the carrier actuators arranged in parallel close to one another, to further enhance the effectiveness and accuracy of the pushing and pulling forces and the control of the relative positions of the platform.

In an embodiment, the cable segment runs over one or more sheaves arranged in between the hull, e.g. the (lower) support, and the platform, the sheaves being fixed to the hull, e.g. to the (lower) support, and/or the platform via pivotal couplings. The effect is that the one or more sheaves may partly or completely determine the longitudinal direction of the cable segment, and thus the pulling force, relative to the hull, e.g. (lower) support, and the platform. This enables the position at which the winches are fixed to be more flexibly chosen. In an embodiment, the multiple carrier winches are fixed below the platform, e.g. between the platform and the hull, e.g. (lower) support, preferably fixed onto the hull, e.g. onto the (lower) support. Preferably, the one or more sheaves are two sheaves, a first sheave of which is connected via a third pivotal coupling to the hull, e.g. (lower) support, and a second sheave of which is connected via a fourth pivotal coupling to the platform. In this way, a movement of the platform relative to the hull, e.g. support, leads to less movement of the cables over the sheaves. For each cable sheave the third and fourth pivotal couplings are preferably embodied as gimballing joints.

In an embodiment, the carrier winches comprise one or more active heave compensating carrier winches, compensating movements of the platform out of the neutral position in the heave direction of the vessel, the cable segment of the carrier cable driven thereby extending substantially in said heave direction of the feeder vessel. The carrier actuators may comprise one or more heave compensating carrier actuators, of which the longitudinal axes extend, in any upper position of the platform, substantially in a heave direction of the feeder vessel. Furthermore, the one or more heave compensating carrier actuators may be at least two heave compensating carrier actuators, of which, at least in the range of upper positions of the platform, the longitudinal axes are arranged spaced apart in the longitudinal direction of the feeder vessel, such that the at least two heave compensating carrier actuators are together configured to passively compensate pitch motions of the vessel by a difference in the extension thereof. In a particular embodiment, each of the carrier winches is an active heave compensating carrier winch. The carrier winches are as such dedicated to substantially compensate heave and possibly also pitch motions, which generally have the largest amplitude compared to the sway, surge, yaw and roll motions.

In a preferred embodiment comprising the active heave compensating carrier winches and the heave compensating carrier actuators, the cable segments of the carrier cables of at least two heave compensating carrier winches each assigned to one or more of the heave compensating carrier actuators may in particular each run, at least in the range of upper positions of the platform, parallel and directly next to the longitudinal axis of the assigned carrier actuators, preferably centrally in between two longitudinal axes of two of the heave compensating carrier actuators assigned to the associated winch. This to obtain as discussed the enhanced effectiveness and accuracy of the pushing and pulling forces and the control of the relative positions of the platform.

In an embodiment comprising the active heave compensating carrier winches and the heave compensating carrier actuators, the one or more heave compensating carrier actuators may be at least two heave compensating carrier actuators, of which, at least in the range of upper positions of the platform, the longitudinal axes are arranged spaced apart in the lateral direction of the feeder vessel, such that the at least two heave compensating carrier actuators are together configured to passively compensate roll motions of the vessel by a difference in the extension thereof. Preferably, again therein the cable segments of the carrier cables of at least two of the heave compensating carrier winches each assigned to one or more of the heave compensating carrier actuators each runs, at least in the range of upper positions of the platform, parallel and directly next to the longitudinal axis of the assigned carrier actuators, preferably centrally in between two longitudinal axes of two of the heave compensating carrier actuators assigned to the associated winch.

In a preferred embodiment comprising both the laterally and longitudinally spaced apart active heave compensating carrier winches and the heave compensating actuators, the heave compensating carrier actuators may be mutually arranged in a rectangle of which a longitudinal centreline of the vessel forms a longitudinal centreline and a lateral axis of the vessel forms a transverse centreline, e.g. both centrelines passing through the lateral centre region of the platform, e.g. crossing in the middle thereof. Preferably, therein two heave compensating actuators are provided in each corner, and the carrier winches consist of four heave compensating carrier winches. Herein the heave compensating carrier winches driving the cable segments of the carrier cables may in particular each be assigned to two of the heave compensating carrier actuators in one respective corner of the rectangle, and each runs, at least in the range of upper positions of the platform, parallel and directly next to the longitudinal axis of the assigned carrier actuators, preferably centrally in between two longitudinal axes thereof.

In an embodiment, the carrier actuators comprise one or more surge compensating carrier actuators, of which the longitudinal axes extend, in any upper position of the platform, substantially in a surge direction of the feeder vessel, wherein for each surge compensating carrier actuator the first pivotal coupling and the second pivotal coupling via which the surge compensating carrier actuator is connected to the hull, e.g. to the (lower) support, and the platform, respectively, are arranged spaced apart in the longitudinal direction of the vessel. Herein, preferably, the first and/or second pivotal couplings via which each surge compensating carrier actuator is connected to the hull, e.g. to the (lower) support, and the platform, respectively, is mounted to or integrated with a lower end of a downwards protrusion from the platform and/or an upper end of an upwards protrusion from the hull, e.g. from the (lower) support.

In an embodiment comprising the surge compensating carrier actuators, the surge compensating carrier actuators may in particular be at least two surge compensating carrier actuators of which the longitudinal axes extend spaced apart in the lateral direction of the feeder vessel, such that the at least two heave compensating carrier actuators are together configured to passively compensate yaw motions of the vessel by a difference in the extension thereof. Therein, preferably, when seen in a top view of the motion compensating carrier assembly, the longitudinal axes of the surge compensating carrier actuators run parallel to and at opposite lateral sides of the longitudinal axis of the vessel, e.g. one at each lateral side.

In an embodiment, the carrier actuators comprise one or more sway compensating carrier actuators, of which the longitudinal axes extend, in any upper position of the platform, substantially in a sway direction of the feeder vessel, wherein for each sway compensating actuator the first pivotal coupling and second pivotal coupling via which the sway compensating carrier actuator is connected to the hull, e.g. to the (lower) support, and the platform, respectively, are arranged spaced apart in the lateral direction of the vessel. Herein, preferably, the first and/or second pivotal couplings via which each sway compensating carrier actuator is connected to the hull, e.g. to the (lower) support and the platform, respectively, is mounted to or integrated with a hull, e.g. (lower) end of a downwards protrusion from the platform and/or an upper end of an upwards protrusion from the hull, e.g. (lower) support.

In an embodiment comprising the sway compensating carrier actuators, the surge compensating carrier actuators may in particular be at least two sway compensating carrier actuators of which the longitudinal axes extend spaced apart in the lateral direction of the feeder vessel, such that the at least two sway compensating carrier actuators are together configured to passively compensate yaw motions of the vessel by a difference in the extension thereof. Herein, preferably, when seen in a top view of the motion compensating carrier assembly, the longitudinal axes of the sway compensating carrier actuators run parallel to and at opposite lateral sides of the longitudinal axis of the vessel, e.g. one at each lateral side.

The invention enables embodiments with a motion compensation of the elongate object retained on the platform that is substantially independent in six degrees of motion—namely, in an embodiment which combines the heave compensating carrier actuators, laterally and longitudinally spaced for compensating pitch and roll, with the surge compensating actuators and the sway compensating actuators, of which the longitudinal axes are spaced apart in the lateral and/or the longitudinal direction, respectively for compensating yaw motions. In general, in a floating condition the relative motions of the platform will be composed of a plurality of the six motions which vary dynamically. The compensation in either direction may be independently controlled by controlling the extension and shortening of the carrier actuators compensating the respective direction, and additionally, that of the cable segment of any carrier winches to which these are assigned.

The actuators and cable segments therein extend substantially in the direction to be compensated thereby, however, it is envisaged that these may also deviate therefrom to some minimal extent which may lead to a motion compensation in one direction also extending or shortening a carrier actuator or any winch for compensating in another direction, while still achieving a motion compensation that is substantially independent in the six directions of motion.

In the active motion compensation by the carrier winches, the position of the platform with respect to the vessel, e.g. the hull, e.g. (lower) support, thereof, may be determined using the real-time signal of a motion or position reference unit. In response to this signal carrier winches haul in or pay out the carrier cable driven thereby to maintain the platform at a substantially stationary position in space, for example, by adjusting the speed of the carrier winch. As discussed, the main benefit of the active compensation in addition to the passive compensation is that it responds more accurately and faster than the passive carrier actuators, so that the combination of the passive actuators and the active winches of the motion compensation mechanism may result an improved control of the position of the platform. This control may be improved further by basing the active compensation on said real-time signals.

In an embodiment, a monitoring means is provided, which is configured to determine the optimal instant in time at which the weight is taken over from the platform by the lifting device, by monitoring the periodic movements of the vessel. Such monitoring means are known per se, and may comprise an accelerometer and/or gyroscope and/or motion reference unit and/or other sensors. Preferably, the monitoring means are configured to determine a maximum height of the vessel in the vertical direction, and furthermore the instant in time at which this maximum height is reached.

In an embodiment, a control system is provided which is configured to generate control signals for the extendable carrier actuators in response to signals from the monitoring means representing the height of the vessel, the determined maximum height of the vessel, and/or the time instant at which the maximum height is reached.

Accurate positioning of the object to be lifted relative to the lifting device on the other vessel or structure may be enhanced by a dynamic positioning (DP) or mooring system. Such systems, known per se, allow keeping the feeder vessel in a relatively constant position without using seabed engaging legs as in a jack-up platform. The mooring system may comprise a number of mooring lines, provided at one end with a suitable means for connecting to the underwater bottom or means for connecting to another structure, and at another end provided around a winch or other suitable taking in/paying out means.

For providing the six degrees of freedom in the relative movement of the platform with respect to the hull, e.g. (lower) support, the first and second pivotal couplings provided to the extendable carrier actuators may for either of these be embodied as either gimballing or spherical joints, universal joints, needle joints, flexible joints, or other joints that allow relative rotation along two or three axes of the first and second pivotal couplings.

In an embodiment wherein the pivotal couplings are embodied as joints allowing rotation along two axes, e.g. cardan joints, the extendable carrier actuator may be configured to allow a relative rotation of its first and second pivotal coupling around the longitudinal axis of the extendable carrier actuator to provide a third rotation axis for the relative rotation of the first and second pivotal couplings.

In an embodiment, the carrier actuators, e.g. at least the heave compensating carrier actuators, when present, and/or the heave compensating carrier winches, when present, of the motion compensation mechanism are furthermore configured to move the platform from the rest position into the neutral upper position and vice versa.

In an embodiment wherein, as is preferred, the multiple carrier actuators of the motion compensation mechanism are hydraulic cylinders having a piston, the cylinders being connected via a medium separator to a pressurized gas buffer the motion platform may be movable from the upper active positions, including at least the neutral position, towards and into the rest position by a reduction of the pressure in the carrier actuators, e.g. at least the heave compensating carrier actuators, and/or by traction by the heave compensating carrier winches, when present, and movable from the rest position into the upper active positions, e.g. the neutral position, by an increase of the pressure in the carrier actuators, e.g. at least the heave compensating carrier actuators. Thereby a convenient way of establishing the movability is obtained, making use of the parts of the motion compensating carrier assembly already present for the motion compensation of relative movements of the platform.

In an embodiment, the motion platform is movable from the upper active positions into a rest position, in which the top surface of the platform is flush with an upper deck of the vessel and the platform extends entirely within an opening in the upper deck. Herein the platform may e.g. movable into the rest position by means of said extendable carrier actuators and/or said one or more carrier winches, as discussed above.

In an embodiment, the platform is laterally arranged next to one or more storage positions on an upper deck of the vessel that is configured for supporting and retaining one or more of said at least one elongate object in the longitudinal direction of the vessel, e.g. laterally in between two such storage positions. Therein, optionally, longitudinally spaced apart storage retaining elements are mounted on top of the upper deck at each of said storage positions for supporting and retaining said one or more of said elongate object in a longitudinal direction of the vessel at the storage position, restricting the movement of said retained elongate objects relative to the upper deck.

In an embodiment wherein the platform is laterally arranged next to one or more storage positions on an upper deck of the vessel, the platform may be longitudinally arranged between fore and aft lateral skidding rails on the upper deck, laterally at least extending from the one or more storage positions to positions fore and aft of the lateral centre region of the platform, respectively, such that the elongate objects retained at the storage positions are skiddable via said fore and aft skidding rails to the lateral centre region of the platform to be supported onto said skidding rails above and longitudinally across the lateral centre region of the platform, at least while the platform is in the rest position thereof. Herein, optionally, when present, the storage retaining elements supporting and retaining the elongate objects at the storage position are supported onto the fore and aft lateral skidding rails such that the elongate objects are skiddable via said fore and aft skidding rails while remaining supported and retained by the retaining elements. Herein, preferably, the storage retaining elements support and retain the elongate objects at a greater height than the platform supports and retains the elongate object, at least in the rest position, e.g. at greater height than the retaining elements of the platform support and retain the elongate object, when present.

In an embodiment, the one platform is arranged in a centre region of the length of an upper deck of the vessel.

In an embodiment, the one platform extends over approximately a third of a width of an upper deck of the vessel.

In an embodiment, the one platform has a width of between 12 and 20 meters, e.g. approximately 16 meters.

In an embodiment, the one platform extends over approximately a third of the length of an upper deck of the vessel.

In an embodiment, the one platform has a length of between 30 and 50 meters, e.g. approximately 40 meters.

In an embodiment, the one platform has a width of between 12 and 20 meters and a length of between 30 and 50 meters, e.g. a width of approximately 16 meters and a length of approximately 40 meters.

In an embodiment, the lower part of the hull, e.g. lower support is arranged below an upper deck, within the hull and below the design waterline, e.g. 10 to 20 meters lower than the upper deck, e.g. approximately 15 meters lower than the upper deck. As discussed, this may lead to motions, in particular the motions of pitch and roll, of the lower part e.g. support emanating from sea motions having a reduced amplitude when compared to the upper deck. This advantageously reduces as well the amplitudes of the corresponding relative motions of the platform to be compensated.

In an embodiment, in the range of upper active positions, the top surface of the platform is located at at least 2 meters above an upper deck of the vessel, e.g. between 2 meters and 12 meters above the upper deck. A height of the retained elongate object of a certain length in the longitudinal direction above the deck on the platform being larger, enables a larger range of pitch angles for the same length of object to be compensated by the motion compensating carrier assembly, without any risk of longitudinal ends of the elongate object contacting the upper deck.

In practice, given a certain length of elongate objects to be retained, the vertical spacing between the lower part, e.g. support, and an upper deck of the vessel, and the height of the platform above the upper deck in the upper positions thereof may be attuned to optimize the mentioned amplitude reduction of rotary motions and the range of enabled pitch angles to be compensated.

In an embodiment that is preferred for compensating pitch motions of the hull, e.g. (lower) support, with respect to the platform, the carrier actuators are configured to establish a mutual difference in extension in heave directions such that the range of upper active positions includes slanted positions of the platform of up to 3° back and forth in the roll directions with respect to the neutral position.

In an embodiment that is preferred for compensating roll motions of the hull, e.g. of the (lower) support, with respect to the platform, the carrier actuators are configured to establish a mutual difference in extension in heave directions such that the range of upper active positions includes slanted positions of the platform of up to 3° back and forth in the pitch directions with respect to the neutral position.

In an embodiment, the carrier assembly is configured to—in the entire range of upper positions—retain the entire elongate object upwardly spaced from an upper deck of the vessel, for example in case the elongate object that is retained on the one platform has a length of at least 40 meters, e.g. of at least 80 or 100 meters, in the longitudinal direction of the vessel.

In a preferred embodiment, the latter three embodiments are combined.

In an embodiment, for compensating heave motions of the hull, e.g. of the (lower) support, with respect to the platform, the range of upper active positions extends over approximately 4 meters in the heave direction of the vessel, e.g. having a lowest upper active position wherein the platform is 2-4 meters above an upper deck, and a highest upper active position wherein the platform is 6-8 meters above the upper deck.

In an embodiment, for compensating surge and sway motions of the hull, e.g. of the (lower) support with respect to the platform, the carrier actuators are configured to extend in surge and sway directions such that the range of upper active positions extends over 2 meters outwards from the neutral position of the platform in the surge and sway directions of the vessel.

In an embodiment, for compensating yaw motions of the hull, e.g. of the (lower) support with respect to the platform, the carrier actuators are configured to establish a mutual difference in extension in surge and/or sway directions such that the range of upper active positions includes pivoted positions of the platform of up to 3° back and forth in the yaw directions with respect to the neutral position.

In an embodiment, when the platform is in the neutral position thereof, the platform is parallel to an upper deck of the vessel, and also parallel to the hull, e.g. to the (lower) support. This enables the carrier actuators compensating at least heave, to be sized substantially equally at least along the longitudinal axes thereof. Furthermore, the neutral position is in this case the position that the platform encounters the most while compensating relative motions.

In an embodiment, the vessel is provided with a water ballast system comprising ballast tanks in the hull and ballast pumps, e.g. allowing to balance the vessel in case of an uneven load distribution over the hull, e.g. during loading monopiles onto the vessel, or unloading monopiles from the vessel.

In an embodiment, the vessel is provided with an active roll damping mechanism, said mechanism comprising:
  a solid roll damping ballast which is movable in the transverse direction of the hull,
  a sensor detecting and/or predicting rolling motion of the hull, and
  a drive and control system operable to cause and control the movements of the solid roll damping ballast in response to the detections of the sensor to provide roll stabilization. Examples of such a mechanism are described in WO2009048322.

The invention furthermore provides a motion compensating carrier assembly as described herein.

The invention provides a motion compensating carrier assembly, which combines the use of the carrier winches for active motion compensation and passive carrier actuators, the use thereof within one single motion compensating carrier assembly, and the use of one single motion compensating platform in this assembly, such as provide the effects and advantages discussed above in relation thereto.

The invention also relates to a motion compensation mechanism as described herein for connecting a platform to a hull, e.g. to a support secured to or integral with the hull, e.g. a lower support, which mechanism may be embodied in any way discussed above in relation thereto to obtain the same effects and advantages, particularly when used in a motion compensating carrier assembly, e.g. as described herein, e.g. to be supported on a feeder vessel, e.g. a feeder vessel as described herein.

The invention further provides methods for compensating motion of an elongate object on a feeder vessel, and methods for transferring an elongate object from a feeder vessel to an offshore structure, e.g. a jack-up vessel.

These methods provide for the use of carrier winches to move the platform relative to a hull, e.g. to a support secured to or integral with the hull, e.g. a lower support, of the feeder vessel in combination with a passive compensation of motions thereof relative to the hull, e.g. support, by means of a damped extension and shortening of multiple extendable actuators upon movements of the platform out of a neutral position. This use comprises hauling in and paying out one or more carrier cables driven by one or more respective carrier winches. Therein the hauling in by each carrier winch shortens a cable segment of the carrier cable driven thereby, which cable segment extends below the platform, e.g. between the platform and the hull, e.g. (lower) support. Therein the shortening of the cable segment counteracts an extension of at least one of the carrier actuators, and moves the platform in the direction towards the hull, e.g. support.

In these methods, the feeder vessel comprises a motion compensated platform connected to a hull, e.g. support, of the feeder vessel in a motion compensated manner, e.g. the vessel and platform being embodied as described herein in more detail. The methods comprise retaining the elongate object on the platform in a transfer position thereof relative to the platform within a laterally central region of the motion compensated platform, such that the elongate object extends in a longitudinal direction of the feeder vessel at least when the platform is in a neutral position on the feeder vessel. The methods further comprise, while retaining the elongate object, compensating relative motions of the elongate object with respect to the feeder vessel to maintain a substantially stationary position of the elongate object in space.

In an embodiment, the carrier winches are employed to, simultaneously with said passive compensation of relative movements of the platform, actively compensate movements of the platform out of the neutral position by hauling in and paying out one or more carrier cables driven by one or more respective carrier winches. As discussed in relation to the device according to the invention, this employment of the carrier winches may advantageously result in improved responsiveness and control of the motion compensation.

An embodiment further comprises, prior to the step of retaining the elongate object on the platform, the step of moving the motion compensated platform from a receiving position with respect to the hull, e.g. (lower) support to the neutral position, e.g. the receiving position corresponding to a rest position of the platform in which the platform is flush with an upper deck of the feeder vessel. The embodiment optionally further comprises, prior to this step of moving the motion compensated platform to the neutral position, the step of moving the elongate object into the transfer position thereof, wherein the platform is in the receiving position on the feeder vessel.

The step of moving the elongate object into the transfer position thereof, wherein the platform is in the receiving position on the feeder vessel, may comprise positioning the elongate object above the transfer position thereof, and consequently retaining the elongate object above the transfer position thereof while moving the motion compensated platform upwards towards the elongate object, until the elongate object is in the transfer position thereof.

The step of positioning of the elongate object above the transfer position thereof may comprise moving the elongate object in a lateral direction of the vessel to above the transfer position from a storage position of the elongate object that is located on an upper deck of the vessel next to the platform in said lateral direction of the vessel. Preferably, the moving of the elongate object in said lateral direction comprises skidding said elongate object over skidding rails on the upper deck of the vessel, preferably said skidding rails extending in said lateral direction spaced from said platform at distinct longitudinal sides thereof. Preferably said retaining the elongate object above the transfer position thereof comprises supporting the elongate object onto said skidding rails.

In an embodiment, the vessel is provided with skid rails in longitudinal direction of the upper deck, e.g. in combination with the mentioned lateral direction skid rails, e.g. said lateral and longitudinal rails crossing one another.

Methods according to the invention for transferring an elongate object from a feeder vessel, e.g. by means of a lifting device arranged on an offshore structure or another vessel, e.g. a jack-up vessel provided with a crane and in raised condition thereof, further comprise, while compensating the relative motions of the elongate object in space, the step of engaging the elongate object by an object suspension device of a lifting device of the other offshore structure. While still compensating the relative motions, these methods further comprise the subsequent step of substantially transferring the weight of the elongate object from the platform to the lifting device of the other offshore structure. Herein, as preferred, the methods envisage that the elongated object is maintained in horizontal orientation, e.g. lifted by the lifting device in horizontal orientation. For example, in practice, a spreader is suspended from a crane hook, and two or more slings are used to suspend the elongated object from the spreader. This approach of maintaining horizontal orientation of the elongated object during at least the first stage of the transfer is preferred over an approach wherein an upending of the object is done whilst a lower end of the object is still supported on the feeder vessel. So, in embodiments, the feeder vessel is devoid of an upending support tool mounted on the vessel.

In embodiments, it is envisaged that the lifting device first lifts the elongated object, e.g. monopile, in horizontal orientation thereof, and is then operated to bring the lifted elongated object in a vertical orientation whilst remaining clear of the feeder vessel. Such an approach is, for example, described in WO2018052291.

Herein, a substantial transfer of the weight is to be interpreted as that the part of the weight of the elongate object supported on the platform is reduced, and thereby the part of the weight supported by the lifting device, e.g. crane, is increased until at least a majority of the weight is carried by the lifting device, and the remaining minority by the platform. The majority is in practice chosen such as to prevent a too large sudden increase of the load of the other offshore structure, e.g. of a tension in the lifting cables upon the moving apart of the platform and elongate object. In an embodiment, e.g. in which the elongate object weighs around 1000 metric tonnes or more, the majority may be taken as around 80% of the weight of the elongate object, so that the moving apart takes place when the lifting device supports 80% of the weight and the platform still supports 20% of the weight. In the method step of transferring the weight, the weight may therefore be transferred until at least 80% of the weight is supported by the other offshore structure, and the remaining 20% or less of the weight is still supported by the platform.

In embodiments, the step of substantially transferring the weight comprises gradually reducing an upward force of the extendable carrier actuators supporting the platform with the elongate object thereon. Preferably, when the extendable carrier actuators are hydraulic cylinders having a piston, the cylinders being connected via a medium separator to a pressurized gas buffer, respectively, said gradually reducing a force of the extendable carrier actuators comprises gradually reducing the pressure of the gas. Said gradually reducing a force of the extendable carrier actuators may comprise a successive stepwise reduction of the force, e.g. as controlled by control signals generated to that end, of approximately 20% of the weight of the elongate object, preferably until approximately 80% of the weight is supported by the lifting device of the other offshore structure, and the remaining approximately 20% of the weight is still supported by the platform. In an embodiment wherein the extendable carrier actuators are embodied as pneumatic or hydraulic cylinders with pistons, the gradual taking over of the weight may be accomplished by controlling, e.g. by the control system generating control signals to that end, the gas buffer connected to the extendable carrier actuators such as to decrease the pressure.

As is known in the art, in order to reduce the risk of collision between the feeder vessel, in particular the platform and/or the components on top thereof and the engaged object suspended there above, for instance as caused by a wave moving the feeder vessel upwards soon after the lifting device on the offshore structure, e.g. the crane(s) on a raised jack-up vessel, began the lifting movement of the elongate object upwards from the platform, the platform and the elongate object may be rapidly moved away from each other. This may be done by rapidly moving the platform downwards as known, and/or moving the elongate object rapidly upwards after the lifting device has substantially taken over the weight of the elongate object from the platform.

In an embodiment, the carrier winches are employed to, e.g. in addition to any active motion compensation thereby, e.g. in particular any heave compensating carrier winches, furthermore employed to, after the substantial transfer of the weight of the elongate object from the platform to the other structure, e.g. a jack-up vessel, e.g. a lifting device thereof, block a hauling in and paying out of the carrier cables, such that said blocking maintains a length of each cable segment of these carrier cables. Thereby an extension of each respective carrier actuator is blocked, and a spacing between the platform and the hull, e.g. support, along the longitudinal axis of each respective carrier actuator is maintained. As such, the invention enables to reduce or prevent an upward movement of the platform, after the lifting device has substantially taken over the weight of the elongate object from the platform. Thereby, any further extension of at least any carrier actuators compensating heave and possibly surge, if present, may also be blocked. The control system may be configured to generate control signals that cause the carrier winches to block, e.g. based on said signals of the monitoring means, as discussed in relation to the device according to the invention. In particular, after the substantial transfer of the weight of the elongate object, the upwards compensating movement of the platform during the downward movement of the wave is stopped, so that the platform moves downward along with the vessel, thereby moving away from the elongate object now suspended from and fully supported by the lifting device. The control system may generate control signals that cause the carrier winches block, and thereby, if actively compensating, to stop compensating.

In a known method, downward movement of the platform may by making use of the downward movement of the vessel, and therewith of the hull, e.g. support, along with a downward movement of a wave to which the feeder vessel is subjected, in which the platform moves downward with the feeder vessel. This method may be combined with the blocking of the carrier cables to establish a downward movement of the platform along with that of the wave.

The invention provides that the platform may, as an alternative to the utilization of the downward movement of the vessel with a wave, e.g. when it is desired not to wait until a wave moves the vessel downwards for said moving apart, or e.g. in case of very moderate waves, be moved downwards and away from the elongate object after said substantial taking over of the weight, e.g. towards its rest position, e.g. with a high acceleration, by means of pulling forces of the carrier cable segments resulting from the carrier winches of the carrier hauling said carrier cables in. This causes the platform to move, e.g. rapidly, away from the elongate object.

In an embodiment, the carrier winches are employed to, e.g. in addition to any active motion compensation thereby, e.g. in particular heave compensating carrier winches, after the substantial transfer of the weight of the elongate object from the platform to the other structure, e.g. a jack-up vessel, e.g. a lifting device thereof, move the platform downwards from the neutral position by hauling in the one or more carrier cables onto respective carrier winches. The moving downwards therein takes place at a speed such that the platform moves away from the elongate object, which is because of the moving away of the platform now entirely supported by the other structure, e.g. the lifting device of the other structure. As mentioned before, the use of the carrier winches for the downward movement of the platform is especially advantageous, as these may achieve a higher and more accurate downwards acceleration relative to utilising e.g. hydraulic actuators for this purpose, since the latter may have a longer reaction time for effecting such movement. A control system may generate control signals that cause the traction by the carrier winches, e.g. based on signals of monitoring means, as discussed in relation to the device according to the invention.

Embodiments of the method for transferring an elongate object from a feeder vessel to another offshore structure comprise, after the lifting device has substantially taken over the weight of the elongate object from the platform, preferably substantially simultaneously with any downward movement of the platform by carrier cables or blocking of carrier cables, initiating an upwards movement of the elongate object from the transfer position by the lifting device of the other offshore structure, e.g. by initiating a hauling in of one or more lifting cables driven by one or more respective lifting winches of the lifting device of the other offshore structure. After said initiating, the elongate object is moved upwards, e.g. with a high acceleration, from the transfer position by the lifting device of the other offshore structure, e.g. by hauling in the one or more lifting cables driven by one or more respective lifting winches of the lifting device. Therein the moving upwards takes place at a speed such that the platform moves away from the elongate object now entirely supported by the lifting device of the other structure, in order to prevent collision. The lifting winches may e.g. be motion compensated lifting winches.

In embodiments, the step of moving the platform downwards, or the step of blocking said hauling in and paying out of the carrier cables, and/or the step of initiating an upwards movement of the elongate object, is initiated at an instant in time wherein the feeder vessel is on or near the top of a wave. In this way optimal use is made of the downward movement of the feeder vessel in moving the elongate object and the platform apart, and the amount of time until the feeder vessel moves upwards again onto a subsequent wave is maximal, so that less power to the carrier winches and/or lifting may be required to further establish a moving apart of the elongate object and the platform which is sufficient to reduce the risk of collision to an acceptable extent.

In embodiments of methods for transferring an elongate object from a feeder vessel to another offshore structure, any downward movement of the platform by the carrier winches, any blocking of the carrier cables, and/or any upwards movement of the elongate object are timed with respect to the sea motions, and executed at speeds and accelerations at least such as to achieve and maintain a distance between the platform and the elongate object after the transfer of the weight of the elongate object, e.g. during and at the top of a subsequent upwards movement of the vessel caused by a subsequent wave, to reduce the chance of collision. In particular, this may be controlled by the control system generating control signals, e.g. based on signals of the monitoring means.

Embodiments in which the elongate object is after the transfer of the weight of the elongate object not moved upwards but moved in another direction, e.g. sideways, by the other structure are also envisaged.

The discussed embodiments of the methods according to the invention may be combined to obtain additive or juxtaposed effects.

The invention also relates to a method for transferring the elongate object to another, onshore, structure, e.g. a storage structure at a quay, wherein the method steps described for the methods for transferring the elongate object to another offshore structure according to the invention are applied correspondingly.

The invention also relates to a method for transferring the elongate object from the other offshore structure onto the feeder vessel, wherein the method steps for transferring the elongate object to another offshore structure according to the invention are applied correspondingly for transferring the elongate object from the other offshore structure to onto the feeder vessel.

Similarly, the invention also relates to a method for transferring the elongate object from the other onshore structure onto the feeder vessel, wherein the method steps for transferring the elongate object to another offshore structure according to the invention are applied correspondingly for transferring the elongate object from the other onshore structure to onto the feeder vessel.

The invention also relates to a method in which use is made of a feeder vessel according to the invention.

The invention also relates to a method in which use is made of a carrier assembly according to the invention.

The invention also relates to a method in which use is made of a motion compensation mechanism according to the invention.

The invention will now be explained in relation to the embodiments shown in the appended figures.

BRIEF DESCRIPTION OF THE DRAWINGS

In the figures:

FIGS. 1a-b show in a top and side view a feeder vessel according to the invention, supporting multiple elongate objects for transfer to another offshore structure, FIG. 1c shows in a back view of a lateral cross-section of the feeder vessel the carrier assembly thereof, FIG. 1d shows in a top view of the feeder vessel the carrier assembly thereof, FIGS. 2a-c show in a side view of a longitudinal cross-section of the feeder vessel the carrier assembly thereof in three different positions, FIGS. 2d-i show in a back view of a lateral cross-section of the feeder vessel the carrier assembly thereof in three different positions, FIGS. 3a-c show in perspective views a carrier assembly according to the invention, FIGS. 4a-d show in a top view and three side views the feeder vessel of FIGS. 1a-b, wherein it transports multiple elongate objects, namely wind turbine rotor blades, wind turbine nacelles and wind turbine towers, FIGS. 5a-b show in a top and side view the feeder vessel of FIGS. 1a-b, wherein it transports multiple elongate objects, namely wind turbine monopiles, and FIGS. 6a-c show in a back view of a lateral cross-section the feeder vessel of FIGS. 1a-b transferring a monopile.

FIG. 7 shows in a back vies of a lateral cross-section the feeder vessel of FIGS. 1a-b in the position of FIG. 6a while a jack-up vessel transfers the monopile.

DETAILED DESCRIPTION OF EMBODIMENTS

Illustrated in FIGS. 1a-b, 4a-d, and 5a-b is an exemplary embodiment of a feeder vessel 1 according to the invention. The feeder vessel 1 is configured for onshore-to-offshore transport of at least one elongate object, e.g. of an offshore wind turbine. The feeder vessel 1 is shown without any elongate object being transported thereby in FIGS. 1a-b.

The feeder vessel 1 has a hull 12 with a bow 11, here a bulbous bow, and an upper deck 13.

The upper deck 13 is provided with an opening 14, or an open top type hold, therein that extends to a lower support 15 in the structure of the hull 12. The lower support 15 is preferably arranged close to the bottom of the hull, e.g. to allow for maximum height for the heave compensating mechanism, e.g. of the actuators thereof, see e.g. FIG. 1c.

The feeder vessel 1 has one motion compensating carrier assembly 2 on the entire deck 13 for handling the elongated object.

The one motion compensating carrier assembly 2 is supported on the lower support 15, and thus on the hull 12.

The carrier assembly 2 has a motion compensation mechanism 31 and a motion compensated platform 21 for receiving and retaining the elongate object extending in a longitudinal direction 1/g, see FIG. 1b, of the feeder vessel 1 at a transfer position 19tp within or across a laterally central region 21d, see e.g. FIG. 1d, of the platform 21. The one platform 21 of the vessel 1 has a top surface 22, in practice of significant dimensions.

The motion compensation mechanism 31 connects the platform 21 to the load bearing lower support 15 in the hull 12. The support 15 is in practice connected, e.g. integrated, with the frames and stiffeners of the hull 12.

As best illustrated in FIGS. 1c, 2a-c, FIGS. 2d-i, and FIGS. 3a-c, the mechanism 31 is configured to provide for compensating movements of the platform 21 with respect to the lower support 15, thus the hull. This is done in manner such as to maintain a stationary position of the platform 21 in space, in which the platform 21 is horizontal and extends at a height above the opening 14 in the upper deck, by moving the platform 21 relative to the lower support within a range of upper active positions 21up. In these upper active positions 21up the motion compensation mechanism 31 extends through the opening 14 in the upper deck 13 and the platform 21 extends entirely at a greater height than the upper deck 13.

FIG. 1c shows the platform 21 along with the motion compensation mechanism 31 and the lower support 15 in two of the upper positions, in which the platform 21 is compensated for sway motions of the feeder vessel 1.

The motion compensated platform 21 is movable from the upper active positions 21up into a rest position 21rp, in which the top surface 22 of the platform is flush with the upper deck 13 and the platform 21 extends entirely within the opening 14 in the upper deck. The platform 21 is shown in this position in the longitudinal cross-section of FIG. 2a, along with the motion compensation mechanism 31 and the lower support 15.

The upper active positions 21up comprise a neutral position 21np in which the platform 21 is parallel to the upper deck. The platform 21 is shown in this position in FIG. 2b. In this position, the motion compensation mechanism 31 is not compensating any motions of the vessel. In the neutral position 21np of the platform 21, the platform is parallel to the upper deck 13, and also parallel to the lower support 15.

FIG. 2c shows the platform 21 in one of the upper positions in which it compensates a surge motion of the feeder vessel 1.

The lateral cross-sections of FIGS. 2d-f show the platform 21 respectively in the neutral position 21np, and in two of the upper positions in which it compensates opposite sway motions of the feeder vessel 1.

The lateral cross-sections of FIGS. 2d-f illustrate that the motion compensation mechanism is compensating vessel motions from a position which corresponds to the rest position 21rp of the platform 21, instead of from the neutral position 21np. This may be useful when one or more objects are retained on the platform that do in a top view of the platform not extend outside the contour of the platform 21. Examples are a single nacelle 19n, a generator or a rotor bearing of a wind turbine.

FIGS. 3a-c show a carrier assembly according to the invention in isolation when mounted to a support 15, with the platform 21 respectively in the neutral position 21np, in one of the upper positions 21up in which it compensates a combined surge and sway motion of the feeder vessel 1, and in an upper position in which it compensates a roll motion of the feeder vessel 1.

To establish the motion compensation of the platform 21 within the range of upper positions 21up, the motion compensation mechanism 31 comprises multiple extendable carrier actuators 32, 33, 34, and multiple carrier winches 41.

The extendable carrier actuators are each configured to extend and shorten along a respective longitudinal axis 321g, 331g, 341g thereof. Each carrier actuator is connected at a respective first longitudinal end thereof via a respective first pivotal coupling 35f to the lower support 15 and at a respective second longitudinal end via a second pivotal coupling 35s to the platform 21, such that of each carrier actuator 32, 33, 34a shortening results from a movement of the platform 21 out of the neutral position 21np towards the lower support 15 along the longitudinal axis 321g, 331g, 341g thereof. This may be verified in FIGS. 2a-i.

The multiple carrier actuators 32, 33, 34 are embodied as passive motion compensators to provide compensating movements of the platform 21 out of the neutral position 21np. As is known in the art, the actuators 32,33,34 are preferably embodied as hydraulic cylinders 32, 33, 34 having a piston and piston rod. These cylinders are connected to via a medium separator, also called accumulator, to a gas buffer, e.g. with pressurized nitrogen gas (not shown).

The longitudinal axes 32lg, 33lg, 34lg of the carrier actuators extend in the longitudinal direction 1lg, a lateral direction lit, and in a vertical direction of the feeder vessel 1vt to provide compensating movements of the platform 21 with respect to the lower support 15 in the directions 1lg 1lt, 1vt.

For each carrier actuator 32, 33, 34 the first and second pivotal couplings 35f, 35s are embodied as cardan joints and the first and second end are mutually rotatable around the longitudinal axis 32lg, 33lg, 34lg of the carrier actuator, or the first and second pivotal couplings are embodied as gimballing joints.

The carrier winches 41 are fixed relative to, or directly to, the lower support 15, see FIGS. 2a-c and 3a-c.

Each carrier winch drives a carrier cable 42 which extends from the respective carrier winch and of which a cable segment 43 extends below the platform such that traction by the respective carrier winch 41 shortens the cable segment 43. By the shortening, each cable segment 43 counteracts an extension of two adjacent carrier actuators 32 and moves the platform 21 towards the neutral position 21np in the direction of the lower support 15.

For example, each carrier winch has a drum onto which the cable 42 is wound. In another embodiment the carrier winch is a traction winch, wherein the cable 42 is stored on a separate spool.

The carrier winches 41 are embodied as active motion compensation winches to compensate movements of the platform 21 out of the neutral position 21np. For example, the winches 41 each have an electromotor drive, that is configured to provide active heave compensation.

By means of the extendable carrier actuators 32, 33, 34 and/or said one or more carrier winches 41, the platform 21 is also movable into the rest position 21rp shown in FIGS. 2a, 2d and 3a.

As shown each cable segment 43 runs, in any upper position 21up of the platform 21, parallel and directly next to the longitudinal axis 32lg of at least one of the carrier actuators 32 assigned to the carrier winch 41 driving the cable 42 of the cable segment 43, namely centrally in between two longitudinal axes 32lg of two of the carrier actuators 32 arranged in parallel close to one another.

Each cable segment 43 runs over a first and second sheave 44f, 44s arranged in between the lower support 15 and the platform 21. The first sheave 44f is connected via a third pivotal coupling 45t to the lower support 15 and the second sheave 44s is connected via a fourth pivotal coupling 45f to the platform 21. For each cable sheave 44 the third and fourth pivotal couplings 45 embodied as gimballing joints.

As shown, the carrier winches 41 are each heave compensating carrier winches 41, providing compensating movements of the platform 21 out of the neutral position 21np in the heave direction 1hv of the feeder vessel 1. The cable segment 43 of the carrier cable 42 driven by each winch extends substantially in the heave direction of the feeder vessel 1. Correspondingly, the carrier actuators 32 parallel to these cable segments 43 are also heave compensating, of which the longitudinal axes 32lg extend, in any upper position 21up of the platform 21, substantially in the heave direction 1hv of the feeder vessel.

The one or more heave compensating carrier actuators 32 are arranged spaced apart in both the longitudinal direction 1lg and the lateral direction 1lt of the feeder vessel 1, such as to together be configured to passively compensate pitch 1pt and roll motions 1rl of the feeder vessel 1 by a difference in the extension thereof. See for instance FIG. 3c, in which the carrier actuators 32 are extended more on one lateral side than on the other such as to compensate a roll motion.

In particular, best shown in FIGS. 1d and 3a-c, the heave compensating carrier actuators 32 are mutually arranged in a rectangle. In FIG. 1d it is shown that a longitudinal centreline of the feeder vessel 1 forms a longitudinal centreline of this rectangle, and a lateral axis of the feeder vessel 1 forms a transverse centreline thereof. Both centrelines pass through the lateral centre region 21c of the platform 21, in particular, cross in the middle thereof. Two heave compensating actuators 32 are provided in each corner of the rectangle, laterally next to each other to sandwich the respective cable segment 43, see also the FIGS. 2d-i.

The heave compensating carrier winches 41 driving the cable segments 43 of the carrier cables 42 are each assigned to two of the heave compensating carrier actuators 32 in one respective corner of the rectangle. Correspondingly, the carrier winches 41 are four heave compensating carrier winches 41, see FIGS. 3a-c.

Both the carrier actuators 32 and the heave compensating carrier winches 41 are furthermore configured to move the platform 21 from the rest position 21rp into the neutral position 21np and vice versa. The platform is movable from each upper active position 21up, including the neutral position 21np, towards and into the rest position 21rp both by a reduction of the hydraulic pressure in the actuators 32, and by traction by the carrier winches 41. The platform is movable from the rest position into the upper active positions 21up, e.g. first into the neutral position 21np, by an increase of the pressure in the actuators 32.

The two carrier actuators 33 are surge compensating carrier actuators 33, of which the longitudinal axes 33lg extend, in any upper position 21up of the platform 21, substantially in a surge direction 1sg of the feeder vessel 1. For each surge compensating carrier actuator 33 the first pivotal coupling 35f and the second pivotal coupling 35s via which the surge compensating carrier actuator is connected to the lower support 15 and the platform, respectively, are arranged spaced apart in the longitudinal direction 1lg of the vessel, see FIGS. 2a-c and FIGS. 3a-c.

The two carrier actuators 34 are sway compensating carrier actuators 34, of which the longitudinal axes 34lg extend, in any upper position 21up of the platform 21, substantially in a sway direction 1sg of the feeder vessel 1. For each actuator 34 the first pivotal coupling 35f and the second pivotal coupling 35s via which the actuator 34 is connected to the lower support 15 and the platform 21, respectively, are arranged spaced apart in the lateral direction 1lt of the vessel, see FIGS. 2d-i and FIGS. 3a-c.

To establish the surge direction of the actuators 33 and the sway direction of the actuators 34, the first and/or second pivotal couplings 35f, 35s via which each actuator 33, 34 is respectively connected to the lower support 15 and the platform 21, is mounted to respectively a lower end of a downwards protrusion 24 from the platform 21 and an upper end of an upwards protrusion 16 from the lower support.

The longitudinal axes 33lg of the surge compensating carrier actuators 33 of which the extend spaced apart in the lateral direction 1lt of the feeder vessel 1, such as to together configured be to passively compensate yaw motions 1yw of the vessel by a difference in the extension thereof. As best visible from FIGS. 3a-c, when seen in a top view of the motion compensating carrier assembly 2, the longitudinal axes 33lg of the surge compensating carrier actuators 33 run parallel to and at opposite lateral sides of the longitudinal axis 1lg of the vessel, e.g. one at each lateral side.

For compensating heave motions of the lower support 15 with respect to the platform 21, the range of upper active positions 21up extends over approximately 4 meters in the heave direction 1hv of the feeder vessel 1, having a lowest upper active position wherein the platform is 2-4 meters above the upper deck 13 and a highest upper active position wherein the platform is 6-8 meters above the upper deck 13, as shown in FIG. 1c.

For compensating surge and sway motions of the lower support 15 with respect to the platform 21, the carrier actuators 32, 33, 34 are configured to extend in surge and sway directions 1sg, 1sw such that the range of upper active positions 21up extends over approximately 2 meters outwards from the neutral position 21np of the platform in the surge and sway directions 1sg, 1sw of the feeder vessel. This is illustrated in FIG. 1d—the range of motion of the platform 21 being indicated around the outer edges of the platform 21.

For compensating pitch and roll motions of the lower support 15 with respect to the platform 21, the carrier actuators 32, 33, 34 are configured to establish a mutual difference in extension in the heave direction 1hv such that the range of upper active positions 21up includes slanted positions of the platform of up to approximately 3° back and forth in both the roll and pitch directions 1rl, 1pt with respect to the neutral position. This is indicated in FIG. 1a for the maximum pitch angle αpt.

For compensating yaw motions of the lower support 15 with respect to the platform 21, the carrier actuators 32, 33, 34 are configured to establish a mutual difference in extension in surge and/or sway directions such that the range of upper active positions 21up includes pivoted positions of the platform 21 of up to approximately 3° back and forth in the yaw direction 21yw with respect to the neutral position 21np.

The one platform 21 is, as preferred, arranged in a centre region of the upper deck 13, preferably extending over less than a third of a width of the upper deck 13.

The one platform 21 has, for example, a width of approximately 16.5 meters. It also extends over less than a third of the length of the upper deck 13, e.g. having a length of approximately 42 meters.

The lower support 15 is mounted in close vicinity to the bottom of the hull of the vessel, for example approximately 15 meters lower than the upper deck 13.

In an embodiment, the range of upper active positions 21up, the top surface 22 of the platform extends between 2 meters and 12 meters above the upper deck.

The configuration of the feeder vessel enables that the carrier assembly 2 is configured to in the entire range of upper positions 21up, retain the entire elongate object upwardly spaced from the upper deck 13 even in the case that the elongate object retained extends over approximately 100 meters, which is a currently possible length of a monopile, in the longitudinal direction 1*lg* of the feeder vessel 1.

Laterally, the platform 21 is laterally arranged in between two storage positions 17 on the upper deck 13 of the vessel, configured for supporting and retaining one or more of said at least one elongate objects 19*b*, 19*cb*, 19*m*, 19*cm*, 19*n*, 19*cn*, 19*t*, 19*ct* in the longitudinal direction 1*lg* of the feeder vessel 1, see FIG. 1*b*.

Longitudinally, the platform 21 is arranged between fore and aft lateral skidding rails 51, 52 that are mounted on the upper deck 13, and do not extend across the platform 21. As preferred, these rails 51, 52 laterally extend over substantially the whole width of the upper deck 13 and therewith of the storage positions 17 and the platform 21. As such the elongate objects retained at the storage positions 17 are skiddable via said fore and aft skidding rails 51, 52 to the lateral centre region 21*c* of the platform 21 to be supported onto said skidding rails 51, 52 above and longitudinally across the lateral centre region 21*c* of the platform 21, at least while the platform 21 is in the rest position 21*rp* thereof.

The feeder vessel 1 is shown in FIGS. 4*a-d* as transporting multiple wind turbine rotor blades 19*b*, multiple wind turbine towers 19*t*, and multiple nacelles 19*n*. In this case, the multiple rotor blades are retained together within a cradle, the cradle including the blades 19*b* forming a first one of the elongate objects 19*cb* being retained at a storage position 17. The multiple nacelles 19*n* are also retained together within a cradle, the cradle including the nacelles forming a second one of the elongate objects 19*cn* being retained at another storage position 17. Therein the cradles form retaining elements 19*re* which when supported on the upper deck 13 restrict a movement of the blades 19*b* and the nacelles 19*n* with respect to the upper deck 13.

The multiple towers 19*t* are retained on the platform 21 by retaining elements 23 mounted on the top surface 22 of the platform 21. These retaining elements 23 are embodied as tower saddles, with a shape complementary to the retained tower 19*t* such as to restrict movement of the multiple towers 19*t* relative to the platform 21.

The feeder vessel 1 is shown in FIGS. 5*a-b* as transporting simultaneously three large monopiles 19*m* which are 100 meters long and have an outer diameter of 11 meters. Two piles are retained in the longitudinal direction 1*lg* of the feeder vessel 1 by two longitudinally spaced apart retaining elements 18 mounted to the upper deck at the storage positions 17, and one pile is retained on the platform 21 in the longitudinal direction 1*lg* by two longitudinally spaced apart retaining elements 23 mounted to the platform.

The retaining elements 18, 23 are preferably embodied as monopile saddles which are shaped complementary to the monopiles 19*m* retained. The retaining elements 18 and 23 restrict the movement of the retained monopiles relative to the upper deck 13 and the platform 21, respectively.

In FIGS. 5*a-b*, the storage retaining elements 18 supporting and retaining the monopiles 19*m* at the storage positions 17 are supported onto the fore and aft lateral skidding rails 51, 52 such that the monopiles 19*m* are skiddable via said fore and aft skidding rails 51, 52 while remaining supported and retained by the storage retaining elements 18, see FIG. 5*b*.

In FIGS. 6*a-c* a use of the invention is illustrated. FIG. 6*a* depicts that the monopile 19*m* which is retained on the platform 21 while the motion compensation mechanism 31 compensating movements of the feeder vessel 1, namely a sway motion to the starboard side. This is just before to the monopile 19*m* is transferred to another structure.

FIG. 6*b* depicts the feeder vessel 1 after the transfer to the other structure 101. The platform 21 is in its rest position 21*rp*, and the monopile 19*m* that was retained in FIG. 6*a* at the port side storage position 17 is now skidded onto the skidding rails 51, 52 from this storage position 17 while being supported by the retaining elements 18, to above and across the lateral centre region 21*c* of the platform 21, in particular to above the retaining elements 23 on the platform. It is here still supported by the retaining elements 18 onto the skidding rails 51, 52. This operation is enabled by the storage retaining elements 18 supporting and retaining the elongate objects at a greater height than the retaining elements 23 mounted to the platform 21 supports and retains the elongate objects.

FIG. 6*c* shows the platform having moved to an upper position 21*up*, namely the neutral position, by means of a pressure increase in the cylinders 32, 33 and 34, such that the monopile 19*m* is now being retained by the retaining elements 23 onto the platform 21. The retaining elements 18 are shown already skidded back to the port side storage position 17. To that end, after engagement of the monopile 19*m* by the upwards movement of the platform 21 towards the neutral position, the platform has moved upwards some distance further in order to let the retaining elements 18 pass towards the storage position 17 underneath the monopile 19*m* now being retained on the platform 21, and has moved back again to the neutral position 21*np*. Thereafter, the motion compensation mechanism will start the compensation of the relative movements of the platform 21, and therewith of the monopile 19*m* retained thereby.

FIG. 7 further illustrates the step between FIGS. 6*a* and 6*b*, namely the transfer of the monopile 19*m* from the feeder vessel 1 to the other structure 101, namely e.g. a jack-up vessel, here the crane 102 on the vessel 101. The jack-up vessel has been jacked-up, so the crane 102 thereon is not subjected to wave induced motions, unlike the vessel 1 that is in floating condition, This transfer is accomplished by a method wherein the monopile 19*m* is retained on the platform 21 in a transfer position 19*tp* thereof within a laterally central region 21*c* of the motion compensated platform 21 such that the monopile 19*m* extends in a longitudinal direction 1*lg* of the feeder vessel 1 in the upper positions of the platform.

While retaining the monopile 19*m*, wave induced motions of the hull of the feeder vessel 1 are compensated to maintain a substantially stationary position of the monopile 19*m* in space. This is done by both passively and actively compensating movements of the platform 21 relative to the lower support 15. The passive compensation is done by means of damped extension and shortening of the multiple extendable carrier actuators 32, 33, 34 upon movements of the platform 21 out of the neutral position 21*np*, and the active compensation by hauling in and paying out the one or more carrier cables 42 driven by the respective carrier winches 41. The hauling in by each carrier winch shortens the cable segment 43 of the driven carrier cable 42, thereby counteracting an extension of the heave compensating carrier actuators 32 and moving the platform 21 towards the support 15.

FIG. 7 illustrates, while retaining the monopile 19*m* and compensating wave induced movements, engaging the monopile 19*m* by an object suspension device 105 of a lifting device 102, here crane, of the jack-up vessel 101.

The method comprises the transfer of the weight of the monopile from the one platform 21 to the lifting device 102 of the jack-up vessel 101, e.g. until at least 80% of the weight is supported by device 102, and the remaining 20% or less of the weight is still supported by the platform 21.

From there, the method can proceed in at least two ways.

A first way to proceed is to move the platform 21 downwards, e.g. rapidly downwards, from the upper position 21up by hauling in one or more, e.g. all, carrier cables 42 driven by one or more respective carrier winches 41, such that said hauling in by each carrier winch shortens the cable segment 43 of the driven carrier cable 42. This shortening counteracts an extension of the heave compensating carrier actuators 32, the moving downwards taking place at a speed such that the platform 21 moves away from the monopile 19m that is then entirely supported by the lifting device 102 of the jack-up vessel 101.

A second way to proceed is to block the hauling in and paying out of the carrier cables 42 driven by one or more respective carrier winches 41, such as to maintain a length of the cable segment 43 of the respective carrier cable 42 driven by each carrier winch 41. Thereby an extension of at least one of the extendable carrier actuators 32 is blocked and a spacing between the platform 21 and the support 15 along the longitudinal axis 32lg of each of the heave compensating carrier actuators 32 is maintained. This blocking also blocks a hauling in and paying out of the carrier cables 42 so that the active motion compensation of the platform 21 by the carrier winches 41 is stopped.

In either way of proceeding the method, it may comprise, in addition to the moving of the platform downwards 21 or the blocking of the hauling in and paying out of the carrier cables 42, initiating an upwards movement of the monopile 19m from the transfer position 19tp by the lifting device 102 by initiating a hauling in of lifting cables 104 driven by respective lifting winches 103 of the lifting device 102, and to subsequently move the monopile 19m upwards from the transfer position 19tp by the lifting device 102 by the lifting winches 103 hauling in the lifting cables 104 of the lifting device 102. This moving upwards takes place at a speed such that the platform 21 moves away from the monopile 19m now entirely supported by the lifting device 102.

The step of moving the platform 21 downwards, or the step of blocking the hauling in and paying out of the carrier cables 42, and/or the step of initiating an upwards movement of the elongate object, is initiated at an instant in time wherein the feeder vessel 1 is on or near the top of a wave.

The invention claimed is:

1. A feeder vessel for onshore-to-offshore transport of at least one elongate object,
    the feeder vessel having a motion compensating carrier assembly supported on the hull, said carrier assembly having:
    one motion compensated platform, configured for receiving and retaining thereon an elongate object, the platform comprising a top surface and a motion compensation mechanism connecting the one motion compensated platform to the hull and configured to provide compensating movements of the platform with respect to the hull,
    said motion compensation mechanism comprising:
        multiple extendable carrier actuators, each configured to extend and shorten along a respective longitudinal axis thereof, each connected at a respective first longitudinal end thereof via a respective first pivotal coupling to the hull and at a respective second longitudinal end via a second pivotal coupling to the platform; and
        one or more carrier winches, each carrier winch configured for driving a carrier cable of which a cable segment extends from the respective carrier winch to the platform, such that traction by the respective carrier winch counteracts an extension of at least one of the carrier actuators,
    wherein the multiple extendable carrier actuators are embodied as passive motion compensators to provide passive compensating movements of the platform, and
    wherein the one or more carrier winches are embodied as active motion compensation winches to provide active compensating movements of the platform.

2. The feeder vessel according to claim 1, wherein the cable segment of the carrier cable driven by each carrier winch runs, in any upper position of the platform, parallel and directly next to the longitudinal axis of at least one of the carrier actuators assigned to the carrier winch.

3. The feeder vessel according to claim 1, wherein the vessel comprises a lower support, secured to or integral with the hull, the carrier actuators being connected to the lower support at the first longitudinal end thereof for connection with the hull,
    wherein the cable segment runs over one or more sheaves that are arranged in between the lower support and the platform, the one or more sheaves each being fixed to one of the lower support and the platform.

4. The feeder vessel according to claim 1, wherein the one or more carrier winches are each embodied as an active heave compensating carrier winch.

5. The feeder vessel according to any one or more of claim 1, wherein the one or more carrier winches are fixed below the platform, between the platform and the hull.

6. The feeder vessel according to claim 1, wherein the motion compensated platform is movable into a range of upper positions thereof, said upper positions comprising a neutral position in which the platform is parallel to and spaced above an upper deck of the hull,
    wherein the motion compensated platform is movable from the upper positions, including the neutral position, into a rest position in which the top surface of the platform is flush with the upper deck and the platform extends entirely within an opening in the upper deck.

7. The feeder vessel according to claim 1, wherein the platform is laterally arranged next to one or more storage positions on an upper deck of the hull of the feeder vessel, which upper deck is configured for supporting and retaining one or more of said elongate objects in a longitudinal direction of the feeder vessel.

8. The feeder vessel according to claim 7, wherein the platform is longitudinally arranged between fore and aft lateral skidding rails on the upper deck, laterally at least extending from the one or more storage positions to positions fore and aft of a lateral centre region of the platform, respectively, such that the elongate objects retained at the storage positions are skiddable via said fore and aft skidding rails to the lateral centre region of the platform to be supported onto said skidding rails above and longitudinally across the lateral centre region of the platform, at least while the platform is in a rest position thereof, in which the top surface of the platform is flush with the upper deck of the feeder vessel and the platform extends entirely within the opening in the upper deck.

9. A method for compensating motion of an elongate object on the feeder vessel according to claim 1, the method comprising the steps of:
    retaining the elongate object on the one platform in a transfer position thereof relative to the platform within a laterally central region of the motion compensated platform such that the elongate object extends in a longitudinal direction of the feeder vessel; and compensating relative motions of the platform and the elongate object with respect to the feeder vessel to maintain a stationary position of the elongate object in space, by simultaneously:

passively compensating movements of the platform relative to the hull by means of an extension and shortening of the multiple extendable carrier actuators; and actively compensating movements of the platform out of the neutral position by hauling in and paying out one or more carrier cables driven by one or more respective carrier winches, wherein said hauling in by each carrier winch shortens a cable segment of the respective carrier cable, thereby counteracting an extension of at least one of the carrier actuators.

10. A method for transferring an elongate object from the feeder vessel according to claim 1 to an offshore structure having a lifting device the method comprising the steps of:

retaining the elongate object on the platform in a transfer position thereof within a laterally central region of the motion compensated platform such that the elongate object extends in a longitudinal direction of the feeder vessel at least when the platform is in a neutral position on the feeder vessel;

compensating relative motions of the platform and the elongate object with respect to the feeder vessel to maintain a stationary position of the elongate object in space, at least by passively compensating movements of the platform relative to the hull, by means of an extension and shortening of multiple extendable carrier actuators upon movements of the platform out of the neutral position;

coupling the elongate object to an object suspension device of the lifting device; and subsequently transferring the weight of the elongate object from the platform to the lifting device until at least 80% of the weight is supported thereby, and the remaining 20% or less of the weight is still supported by the platform; and subsequently moving the platform downwards by hauling in one or more carrier cables driven by one or more respective carrier winches, such that said hauling in by each carrier winch shortens a cable segment of the driven carrier cable, said shortening counteracting an extension of at least one of the carrier actuators, the moving downwards taking place at a speed such that the platform moves away from the elongate object now entirely supported by the lifting device.

11. The method according to claim 10, further comprising, substantially simultaneously with the step of moving the platform downwards, the step of:

initiating an upwards movement of the elongate object from the transfer position by the lifting device of the other offshore structure; and further comprising the subsequent step of:

moving the elongate object upwards from the transfer position by the lifting device of the other offshore structure, the moving upwards taking place at a speed such that the platform moves away from the elongate object now entirely supported by the lifting device of the other structure.

12. The method according to claim 10, wherein the step of transferring the weight comprises gradually reducing an upward force of the extendable carrier actuators supporting the platform with the elongate object thereon, and wherein the extendable carrier actuators are hydraulic cylinders having a piston and piston rod, the hydraulic cylinders being connected via a medium separator to a gas buffer, and said gradually reducing a force of the extendable carrier actuators comprises gradually reducing a pressure within the cylinders.

* * * * *